United States Patent
Harrison et al.

(10) Patent No.: US 8,583,759 B2
(45) Date of Patent: Nov. 12, 2013

(54) CREATION AND PRESENTATION OF SELECTIVE DIGITAL CONTENT FEEDS

(75) Inventors: Blair R. R. Harrison, Sherman Oaks, CA (US); Adrian K. Roston, Los Angeles, CA (US); Michael M. Gordon, Paradise Valley, CA (US)

(73) Assignee: Frequency IP Holdings, LLC, Los Angeles, CA (US)

( * ) Notice: Subject to any disclaimer, the term of this patent is extended or adjusted under 35 U.S.C. 154(b) by 0 days.

(21) Appl. No.: 13/296,183

(22) Filed: Nov. 14, 2011

(65) Prior Publication Data

US 2012/0278428 A1 Nov. 1, 2012

Related U.S. Application Data

(63) Continuation of application No. PCT/US2011/034653, filed on Apr. 29, 2011.

(30) Foreign Application Priority Data

Apr. 29, 2011 (AU) ................................ 2011202182

(51) Int. Cl.
*G06F 15/16* (2006.01)
(52) U.S. Cl.
USPC ........... 709/217; 709/201; 709/202; 709/203; 709/204; 709/219; 709/231
(58) Field of Classification Search
USPC .......... 709/217, 201, 202, 203, 204, 219, 231
See application file for complete search history.

(56) References Cited

U.S. PATENT DOCUMENTS

| | | | |
|---|---|---|---|
| 5,485,197 | A | 1/1996 | Hoarty |
| 5,499,330 | A | 3/1996 | Lucas et al. |
| 5,515,486 | A | 5/1996 | Amro et al. |
| 5,621,874 | A | 4/1997 | Lucas et al. |

(Continued)

FOREIGN PATENT DOCUMENTS

| | | |
|---|---|---|
| KR | 10-2009-0079662 A | 7/2009 |
| KR | 10-2010-0003666 A | 1/2010 |
| WO | 2011/095693 A1 | 8/2011 |
| WO | 2011/148054 A1 | 12/2011 |

OTHER PUBLICATIONS

Australian Patent Office, Examiners First Report on Patent Application No. 2011202182 mailed on Jun. 10, 2011, 2 pages.

(Continued)

*Primary Examiner* — Lan-Dai T Truong
(74) *Attorney, Agent, or Firm* — Kilpatrick Townsend & Stockton LLP

(57) ABSTRACT

Methods and systems for creating and presentation of selective digital content feeds are disclosed. A user can design a selective feed comprised of video feed items, for example. An aggregation system searches two or more Internet services specified by the user to gather feed items. Those feed items are filtered according to a media type, such as video, such that each feed item is a video or has a link to a video. The feed items are gathered for presentment with a user interface that allows playback of the video feed items organized in some way, such as ascending order. For one embodiment, Internet video content is gathered from various sources to provide a consistent interface to the video content without the need to navigate all over the web to manually locate each video item.

20 Claims, 11 Drawing Sheets

(56) References Cited

U.S. PATENT DOCUMENTS

| | | | |
|---|---|---|---|
| 5,677,708 | A | 10/1997 | Matthews, III et al. |
| 5,689,287 | A | 11/1997 | Mackinlay et al. |
| 5,706,448 | A | 1/1998 | Blades |
| 5,745,109 | A | 4/1998 | Nakano et al. |
| 5,754,809 | A | 5/1998 | Gandre |
| 5,880,733 | A | 3/1999 | Horvitz et al. |
| 5,940,076 | A | 8/1999 | Sommers et al. |
| 5,977,974 | A | 11/1999 | Hatori et al. |
| 5,986,638 | A | 11/1999 | Cheng |
| 5,991,799 | A | 11/1999 | Yen et al. |
| 6,005,579 | A | 12/1999 | Sugiyama et al. |
| 6,016,145 | A | 1/2000 | Horvitz et al. |
| 6,023,275 | A | 2/2000 | Horvitz et al. |
| 6,069,606 | A | 5/2000 | Sciammarella et al. |
| 6,118,480 | A | 9/2000 | Anderson et al. |
| 6,198,483 | B1 | 3/2001 | Launais |
| 6,211,921 | B1 | 4/2001 | Cherian et al. |
| 6,230,116 | B1 | 5/2001 | Ronen et al. |
| 6,266,098 | B1 | 7/2001 | Cove et al. |
| 6,411,307 | B1 | 6/2002 | Rosin et al. |
| 6,448,987 | B1 | 9/2002 | Easty et al. |
| 6,466,237 | B1 | 10/2002 | Miyao et al. |
| 6,473,751 | B1 | 10/2002 | Nikolovska et al. |
| 6,515,656 | B1 | 2/2003 | Wittenburg et al. |
| 6,570,582 | B1 | 5/2003 | Sciammarella et al. |
| 6,577,330 | B1 | 6/2003 | Tsuda et al. |
| 6,628,313 | B1 | 9/2003 | Minakuchi et al. |
| 6,636,246 | B1 | 10/2003 | Gallo et al. |
| 6,662,177 | B1 | 12/2003 | Martino et al. |
| 6,680,749 | B1 | 1/2004 | Anderson et al. |
| 6,693,606 | B1 | 2/2004 | Shitisawa et al. |
| 6,819,344 | B2 | 11/2004 | Robbins |
| 6,839,072 | B2 | 1/2005 | Trajkovic et al. |
| 6,918,091 | B2 | 7/2005 | Leavitt et al. |
| 6,961,943 | B2 | 11/2005 | Miller et al. |
| 6,973,628 | B2 | 12/2005 | Asami |
| 6,983,426 | B1 | 1/2006 | Kobayashi et al. |
| 6,990,637 | B2 | 1/2006 | Anthony et al. |
| 7,013,435 | B2 | 3/2006 | Gallo et al. |
| 7,036,091 | B1 | 4/2006 | Nguyen |
| 7,051,291 | B2 | 5/2006 | Sciammarella et al. |
| 7,065,710 | B2 | 6/2006 | Hayashi et al. |
| 7,091,998 | B2 | 8/2006 | Miller-Smith |
| 7,093,201 | B2 | 8/2006 | Duarte |
| 7,111,788 | B2 | 9/2006 | Reponen |
| 7,137,075 | B2 | 11/2006 | Hoshino et al. |
| 7,139,001 | B2 | 11/2006 | Hoddie et al. |
| 7,139,006 | B2 | 11/2006 | Wittenburg et al. |
| 7,159,177 | B2 | 1/2007 | Billmaier et al. |
| 7,263,667 | B1 | 8/2007 | Hoellerer et al. |
| 7,271,734 | B2 | 9/2007 | Sata et al. |
| 7,296,242 | B2 | 11/2007 | Agata et al. |
| 7,350,157 | B1 | 3/2008 | Billmaier et al. |
| 7,380,260 | B1 | 5/2008 | Billmaier et al. |
| D571,821 | S | 6/2008 | Amacker |
| 7,383,503 | B2 | 6/2008 | Banks |
| D573,605 | S | 7/2008 | Amacker |
| 7,412,650 | B2 | 8/2008 | Gallo |
| 7,412,660 | B2 | 8/2008 | Donalson |
| 7,418,671 | B2 | 8/2008 | Hama et al. |
| 7,426,467 | B2 | 9/2008 | Nashida et al. |
| 7,487,459 | B2 | 2/2009 | Billmaier et al. |
| 7,523,416 | B2 | 4/2009 | Johnson et al. |
| D591,765 | S | 5/2009 | Amacker |
| 7,543,245 | B2 | 6/2009 | Irimajiri |
| D596,190 | S | 7/2009 | Garcia |
| 7,562,312 | B2 | 7/2009 | Rochford et al. |
| 7,574,656 | B2 | 8/2009 | Billmaier et al. |
| 7,581,195 | B2 | 8/2009 | Sciammarella et al. |
| 7,594,246 | B1 | 9/2009 | Billmaier et al. |
| 7,607,107 | B2 | 10/2009 | Iten et al. |
| D604,742 | S | 11/2009 | Nagata et al. |
| D605,199 | S | 12/2009 | Nagata et al. |
| D609,243 | S | 2/2010 | Song |
| 7,681,150 | B2 | 3/2010 | Hsieh et al. |
| 7,685,530 | B2 | 3/2010 | Sherrard et al. |
| D615,098 | S | 5/2010 | Winjum |
| 7,710,423 | B2 | 5/2010 | Drucker et al. |
| 7,720,349 | B2 | 5/2010 | Ogikubo |
| 7,730,425 | B2 | 6/2010 | De Los Reyes et al. |
| 7,900,161 | B2 | 3/2011 | Nakamura et al. |
| 8,151,215 | B2 | 4/2012 | Baurmann et al. |
| 8,154,549 | B2 | 4/2012 | Abe et al. |
| 8,434,015 | B2 | 4/2013 | Nozaki et al. |
| 2002/0032696 | A1 | 3/2002 | Takiguchi et al. |
| 2002/0033848 | A1 | 3/2002 | Sciammarella et al. |
| 2002/0126121 | A1 | 9/2002 | Robbins |
| 2002/0138617 | A1 | 9/2002 | Christfort et al. |
| 2003/0048295 | A1 | 3/2003 | Lilleness et al. |
| 2003/0061206 | A1 | 3/2003 | Qian |
| 2003/0093794 | A1 | 5/2003 | Thomas et al. |
| 2003/0222890 | A1 | 12/2003 | Salesin et al. |
| 2004/0100479 | A1 | 5/2004 | Nakano et al. |
| 2004/0150657 | A1 | 8/2004 | Wittenburg et al. |
| 2004/0155907 | A1 | 8/2004 | Yamaguchi et al. |
| 2004/0210567 | A1 | 10/2004 | Bourdoncle |
| 2005/0010876 | A1 | 1/2005 | Robertson et al. |
| 2005/0086611 | A1 | 4/2005 | Takabe et al. |
| 2005/0091596 | A1 | 4/2005 | Anthony et al. |
| 2005/0108755 | A1 | 5/2005 | Nishikawa et al. |
| 2005/0187943 | A1 | 8/2005 | Finke-Anlauff et al. |
| 2005/0229102 | A1 | 10/2005 | Watson et al. |
| 2005/0289482 | A1 | 12/2005 | Anthony et al. |
| 2006/0048076 | A1 | 3/2006 | Vronay et al. |
| 2006/0095628 | A1 | 5/2006 | Ludwig et al. |
| 2006/0174211 | A1 | 8/2006 | Hoellerer et al. |
| 2006/0190817 | A1 | 8/2006 | Banks |
| 2006/0209062 | A1 | 9/2006 | Drucker |
| 2007/0028279 | A1 | 2/2007 | Kim |
| 2007/0061745 | A1 | 3/2007 | Anthony et al. |
| 2007/0067736 | A1 | 3/2007 | Aaltonen |
| 2007/0101364 | A1 | 5/2007 | Morita |
| 2007/0139410 | A1 | 6/2007 | Abe et al. |
| 2007/0220431 | A1 | 9/2007 | Nakamura et al. |
| 2007/0225047 | A1* | 9/2007 | Bakos ............ 455/566 |
| 2008/0034276 | A1 | 2/2008 | Ficco |
| 2008/0195701 | A1 | 8/2008 | Venkatsubra et al. |
| 2009/0055746 | A1 | 2/2009 | Dimitrova et al. |
| 2009/0125842 | A1 | 5/2009 | Nakayama |
| 2009/0240693 | A1 | 9/2009 | Davidson |
| 2009/0315867 | A1 | 12/2009 | Sakamoto et al. |
| 2009/0328101 | A1 | 12/2009 | Suomela et al. |
| 2010/0100537 | A1* | 4/2010 | Druzgalski et al. ........... 707/713 |
| 2010/0241976 | A1 | 9/2010 | Nozaki et al. |
| 2010/0257484 | A1 | 10/2010 | Nakamura et al. |
| 2010/0277496 | A1 | 11/2010 | Kawanishi et al. |
| 2010/0293560 | A1* | 11/2010 | Bland et al. ............ 719/328 |
| 2010/0293580 | A1 | 11/2010 | Latchman |
| 2010/0313166 | A1 | 12/2010 | Nakayama et al. |
| 2010/0313255 | A1 | 12/2010 | Khuda |
| 2011/0276923 | A1 | 11/2011 | Zambetti et al. |
| 2012/0005702 | A1 | 1/2012 | Tindell |
| 2012/0056889 | A1 | 3/2012 | Carter et al. |
| 2012/0120316 | A1 | 5/2012 | Lee |
| 2012/0150994 | A1* | 6/2012 | Coad et al. ............ 709/217 |
| 2012/0246596 | A1 | 9/2012 | Ording et al. |
| 2012/0278428 | A1 | 11/2012 | Harrison et al. |
| 2012/0278725 | A1 | 11/2012 | Gordon et al. |
| 2012/0288260 | A1 | 11/2012 | Potrebic et al. |
| 2012/0317218 | A1 | 12/2012 | Anderson et al. |
| 2012/0329540 | A1 | 12/2012 | Wayans et al. |
| 2013/0014059 | A1 | 1/2013 | Nakayama |
| 2013/0132994 | A1 | 5/2013 | Murphy et al. |

OTHER PUBLICATIONS

International Search Report and Written Opinion of PCT/US2011/034653 mailed Dec. 20, 2011, 9 pages.

U.S. Appl. No. 13/460,305, Office Action mailed Sep. 20, 2012, 4 pages.

U.S. Appl. No. 13/469,717, Office Action mailed Aug. 15, 2012, 4 pages.

U.S. Appl. No. 13/469,717, Office Action mailed Oct. 16, 2012, 9 pages.

(56) References Cited

OTHER PUBLICATIONS

U.S. Appl. No. 13/460,305, Office Action mailed Jan. 2, 2013, 3 pages.

"[MWC] Interactive television of the future: Fuugo," uploaded by channelintel on Feb. 16, 2010, 2 mins 56 seconds. Retrieved from: http://www.youtube.com/watch?v=pTIEioX3Ek.

"Fuugo Introduction," uploaded Feb. 14, 2010 by axeltechnologies, 2 mins 5 seconds. Retrieved from: http://www.youtube.com/watch?v=mlwc_HQqkyM.

"Fuugo TV product release at CES 2011," uploaded Jan. 3, 2011 by axeltechnologies, 5 mins 36 seconds. Retrieved from: http://www.youtube.com/watch?v=zwC1dXF4wgg.

"Fuugo Video 1.0 Introduction," uploaded Nov. 7, 2011 by FuugoVideo, 49 seconds. Retrieved from: http://www.youtube.com/watch?v=L7fZaae2wMA.

Bing search results "Carousel Video Feed," search conducted Jun. 12, 2013, 1 page. Accessed at: http://www.bing.com/search?q=carousel+video+feed . . . .

Bing search results "Carousel Video Feed Icon," search conducted Jun. 12, 2013, 1 page. Accessed at: http://www.bing.com/search?q=carousel+video+feed+icon . . . .

Bing search results "Carousel Video Feed Combine Icon," search conducted Jun. 12, 2013, 1 page. Accessed at: http://www.bing.com/search?q=carousel+video+Feed+combine+icon . . . .

U.S. Appl. No. 13/460,305, filed Apr. 30, 2012 Notice of Allowance mailed Jun. 18, 2013, 35 pages.

U.S. Appl. No. 13/469,717, filed May 11, 2012 Notice of Allowance mailed Apr. 15, 2013, 6 pages.

U.S. Appl. No. 13/717,597, filed Dec. 17, 2012 First Action Interview Pre-interview Communication mailed May 22, 2013, 4 pages.

\* cited by examiner

CREATION AND PRESENTATION OF SELECTIVE DIGITAL CONTENT FEEDS

CROSS-REFERENCE TO RELATED APPLICATION

This application claims priority to Australian Patent Application Serial No. 2011202182, filed May 11, 2011, which is a national phase of PCT/US2011/034653, filed Apr. 29, 2011 both of which are incorporated herein by reference in their entirety.

BACKGROUND

This application relates in general to creation of, and presentation of, selective digital content feeds and, but not by way of limitation, to creation of, and presentation of, selective digital content feeds comprising primarily or exclusively video and video-related content.

There are many services available to users through the use of the Internet, including websites, other Internet sites, publishing services, media services, data services, information services, electronic commerce services, electronic transaction services, payment services, software and content download services, communications services, other remotely accessed sites and services, and other digital sites, centers, destinations, or systems; whether shared or dedicated, public or private, institutional or personal, fixed or mobile, wired or wireless; and whether accessed through a browser, mini-browser, embedded browser, application, other software program, or other interface. Examples of popular Internet services in widespread use today include, but are not limited to: content websites that may include primarily video or audio content, primarily text and graphics (including photographs) content, or a mixture of several content and media types, including websites such as CNN.com™, Politico.com™, HuffingtonPost.com™, NYTimes.com™, and others; video publishing websites, such as YouTube™, DailyMotion™, Metacafe™, and others; entertainment content services, such as Netflix™, Pandora™, Hulu™, Zynga™; social networking sites, such as Facebook™, Twitter™, and MySpace™; and many others.

Digital content provided by Internet services can include any of, all of, or any combination of proprietary content, exclusively or non-exclusively licensed content, syndicated content, member-provided content, user-provided content, system-generated content, messages or emails from one or more users to one or more other users, social content, comments, ratings, embedded links to other digital content, tags, maps, locations, time and date content, user identifiers, source identifiers, and other related or unrelated content. The hyperlinked structure of the World Wide Web and the Hypertext Transfer Protocol, the advanced capabilities of modern web browsers, the ability (built into an increasing range of modern user devices) to execute programs, the flexibility inherent in application software developed and delivered to user devices, the rise of common platforms that support both broadly deployed and more narrowly focused functionality across many discrete Internet services, and the ability to stream data and content from, to, and among users and Internet services in realtime or near realtime, individually and collectively have increasingly allowed Internet services to create content and data feeds that are simple, complex, or compound, and include as many, or as few, diverse components as is desired.

A user may use more than one Internet service, sequentially, concurrently, or simultaneously; may use different Internet services with different degrees of interest, intensity, frequency, sophistication, depth of knowledge of the service, and/or skill; and may vary her selection and mix of services from time to time, or over time, according to tasks and interests, because of the Internet service choices of others, according to her choice of device at the moment or over time, or for other reasons.

Users increasingly use devices other than, or in addition to, browser-equipped personal computers to access Internet services, including SMS-capable and other mobile phones, web-equipped mobile phones, smartphones, Internet-ready television sets, digital set-top boxes, DVD and Blu-Ray players, digital video recorders, videogame consoles, tablets such as the iPad™, and other devices. These devices exhibit a wide array of form factors, memory, storage, displays, output interfaces, user input interfaces and devices, and other peripherals and components. Users may have preferences and habits that influence or determine the choice of device for a given purpose, for a given time and place, or for a given mode of use, because of, or regardless of, such device aspects.

There are numerous standards available for use in browsers, browser-equipped personal computers, and the numerous other devices used by users to access Internet services. These standards are sometimes deployed in mass production products before being finally determined, at different times for different products, in heterogeneous technical implementations, and with varying degrees of completeness; they often evolve over time, at times discontinuously; and they fluctuate in popularity. As a result, devices are not always technically uniform, and not all such standards are supported by all device and component providers. For example, some browsers support HTML5 and some browsers do not; different HTML5-ready browsers support different media standards (e.g., when rendering content identified with the <video> tag some support H.264, whereas others support WebM™ or another video codec); some devices support Adobe™ Flash™, while some devices do not (e.g., Apple™ iPhone™ and iPad™ do not); or, one set-top box may support MPEG2 video but not H.264 video, whereas another may support both and a third may support just H.264. In addition, there are diverse content security schemes deployed across devices, including proprietary encryption schemes, consortia-based encryption schemes, and other encryption schemes; and there are diverse rights management and user authentication schemes, including consortia-based schemes, such as Ultra-Violet™, and vendor-proprietary schemes, such as Disney™ Keychest™ and Apple™ iTunes™.

As the variety and capability of devices available to users have increased and as user behavior has evolved in response to new devices and capabilities, content company strategies have also evolved. Aspects of evolving content company strategies include: blocking some or all devices from accessing some or all content; modifying or customizing technical versions of content available on some or all devices; modifying or customizing editorial versions of content available on some or all devices; modifying or customizing advertising, sponsorships, or other promotional aspects presented in conjunction with content accessed via some or all devices; making content available on different devices with different access prices, terms, user rights and privileges, and other conditions; and many other strategy variations. Content company strategies and aspects of strategies commonly vary from device to device, from content company to content company on a given device, and from one geography to another. For example, in the United States, ABC™/Disney™ makes most ABC™ network television shows available on broadcast television with commercials, online with commercials, and online for download via Apple™ iTunes™ without commercials but at a charge per episode, but blocks the availability of these shows on GoogleTV™; while at the same time, it makes most Disney™ network television shows available on broadcast television without commercials, online with commercials, and online for download via iTunes™ without commercials but at a charge per episode, and blocks the availability of these shows on GoogleTV™.

Most Internet services operate legitimately. Legitimate Internet services may properly obtain rights to content through licensing, syndication, fair use, government permission, or other legitimate methods, or may produce content of their own, or may pursue a combination of these and other methods. Some Internet services, however, are less concerned about obtaining proper rights to content, and may rely on their users to have obtained rights, may rely on actual or alleged legal safe harbor provisions, or may pay little or no attention to rights questions. The problem of intellectual property piracy has increased as user Internet use has increased.

SUMMARY

In one embodiment, the present disclosure provides methods and systems for creating and presentation of selective digital content feeds. A user can design a selective feed comprised of video feed items, for example. An aggregation system searches two or more Internet services specified by the user to gather feed items. Those feed items are filtered according to a media type, such as video, such that each feed item is a video or has a link to a video. The feed items are gathered for presentment with a user interface that allows playback of the video feed items organized in some way, such as ascending order. For one embodiment, Internet video content is gathered from various sources to provide a consistent interface to the video content without the need to navigate all over the web to manually locate each video item.

In another embodiment, the present disclosure provides a content processing system for providing personalized video content feeds to users from the Internet. The content processing system includes a first and second feed services, an aggregation system and a selective video feed. The first service feed is acquired from a first Internet service, which is accessible from the Internet, wherein the first service feed includes a plurality of first feed items that each link to content objects available from the Internet. The second service feed is acquired from a second Internet service, which is accessible from the Internet, wherein the second service feed includes a plurality of second feed items that each link to content objects available from the Internet. The aggregation system receives the first and second service feeds and respectively reduces them to a first subset of the plurality of first feed items and a second subset of the plurality of second feed items, wherein the first subset and the second subset are limited to video feed items. The selective video feed includes the first subset of the plurality of first feed items and the second subset of the plurality of second feed items.

In yet another embodiment, the present disclosure provides a method for processing personalized video content feeds to users from the Internet. A first service feed is acquired, including a plurality of first feed items that each link to content objects available from the Internet, from a first Internet service. A second service feed is acquired, including a plurality of second feed items that each link to content objects available from the Internet, from a second Internet service. The first service feed is filtered to a first subset of the plurality of first feed items. The second service feed is filtered to a second subset of the plurality of second feed items. The first subset and the second subset are combined into a video selective feed. The video selective feed is delivered to a user.

In yet another embodiment, the present disclosure provides a method for providing personalized video feeds to a user gathered from the Internet. Selection of a first content feed is sent, including a plurality of first feed items that each link to content objects available from the Internet, from a first Internet service. Selection of a second content feed is sent, including a plurality of second feed items that each link to content objects available from the Internet, from a second Internet service. A criteria receiving from the user specifying filtering of one of: the first service feed to a first subset of the plurality of first feed items, and/or the second service feed to a second subset of the plurality of second feed items. The criteria is sent. A combination of the first subset and the second subset is received as a selective feed of video content. The selective feed is rendered for the user as a series of videos.

In one embodiment, the present disclosure provides a method for providing personalized content feeds to users from the Internet. A first service feed is acquired, including a plurality of first feed items that each link to content objects available from the Internet, from a first Internet service. A second service feed is acquired, including a plurality of second feed items that each link to content objects available from the Internet, from a second Internet service. The first service feed is filtered to a first subset of the plurality of first feed items. The second service feed is filtered to a second subset of the plurality of second feed items. The first subset and the second subset are combined into a selective feed. The selective feed is delivered to a user.

In another embodiment, the present disclosure provides a video processing system for providing personalized content feeds to users from the Internet. The video processing system comprising one or more hardware servers configured to: acquire a first service feed, including a plurality of first feed items that each link to content objects available from the Internet, from a first Internet service, acquire a second service feed, including a plurality of second feed items that each link to content objects available from the Internet, from a second Internet service, filter the first service feed to a first subset of the plurality of first feed items, filter the second service feed to a second subset of the plurality of second feed items, combine the first subset and the second subset into a selective feed, and deliver the selective feed to a user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
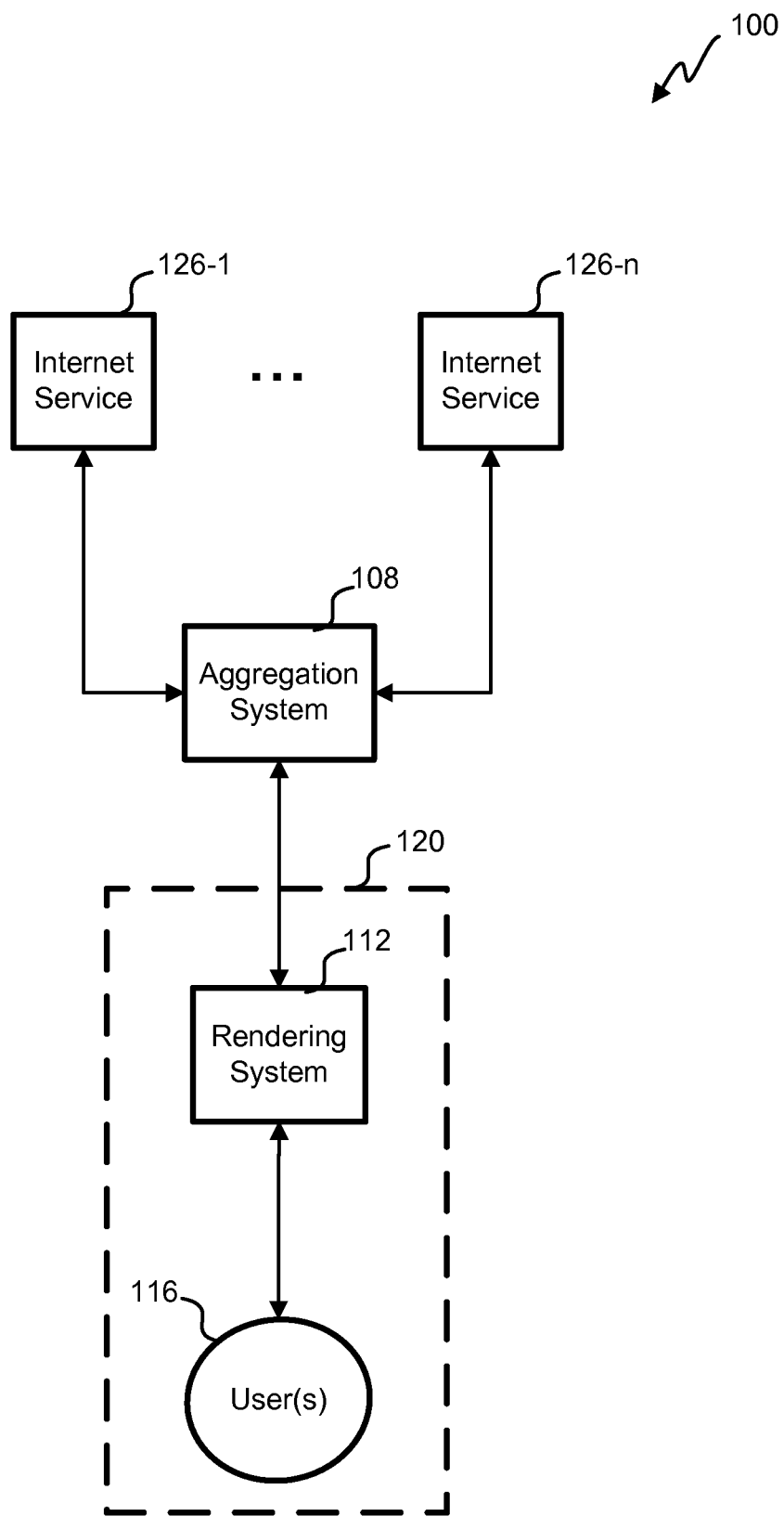
FIG. 1 depicts a block diagram of an embodiment of an Internet system that aggregates two or more Internet service feeds.
Figure 2A:
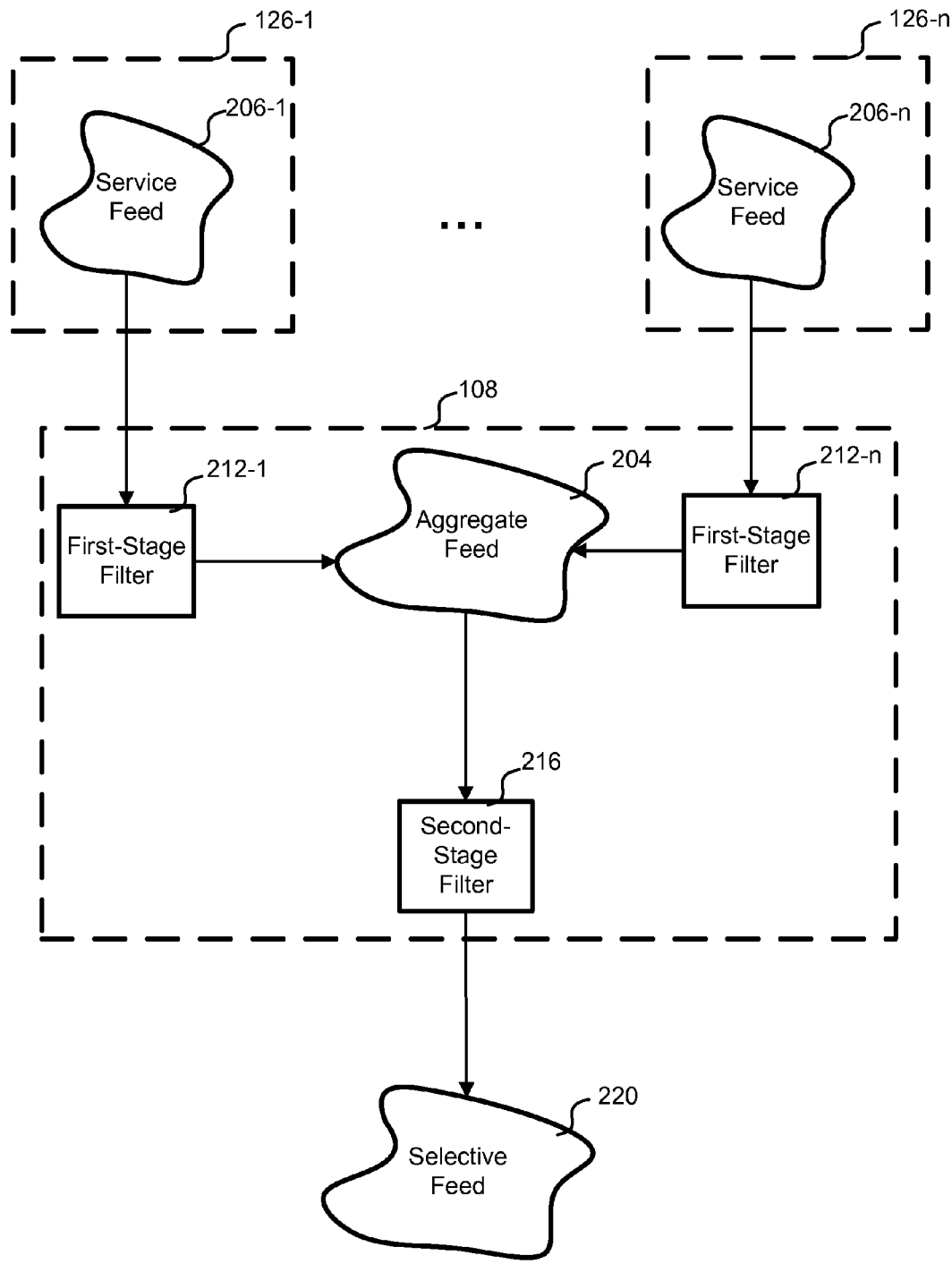
FIGS. 2A, 2B and 2C depict diagrams of embodiments of a feed processing flow.

Referring first to FIGS. 1 and 2A, a primary embodiment is shown that includes an Internet system 100 that aggregates two or more Internet service feeds 206. FIG. 1 shows a block diagram of the Internet system 100 without showing the Internet or other network that couples the various blocks together. FIG. 2 shows a functional diagram of various feeds and filters that operate to convert service feeds 206 into selective feeds 220. Only a single selective feed 220 and a single user 116 is shown, but it is to be understood that there are many different selective feeds 220 for many different users 116 supported by the Internet system 100. An aggregation service 108 selectively and optionally narrows the aggregate of the service feeds 206 into one or more selective feeds 220, and presents the selective feed(s) 220 to a user 116 viewing with a rendering system/device/agent 112 at a user location 120. In this disclosure, the singular and plural terms "selective feed" and "selective feeds" are used interchangeably for convenience, clarity and readability, to mean one or more selective feeds 220, and should be interpreted accordingly. In the primary embodiment, a selective feed 220 is created from the aggregate of service feeds 206 by including only items from the aggregate of service feeds 206 which are, contain, refer to, or otherwise indicate, video content. This creates a condensed and video-specific selective feed 220 from the aggregate of service feeds 206. The Internet services 126 are generally operated by third parties (e.g., websites, Facebook™, YouTube™, Twitter™).

In other embodiments, a selective feed 220 is created by selecting (meaning to include and/or exclude) items which are, contain, refer to, or otherwise indicate one or more media types other than video or in addition to video; is created from a single Internet service feed 206 by selecting items which are, contain, refer to, or otherwise indicate video content; is created from a single Internet service feed 206 by selecting items which are, contain, refer to, or otherwise indicate one or more media types other than video or in addition to video; is created from a single Internet service feed 206 or from an aggregate of more than one Internet service feed 206 by selectively narrowing the single service feed 206 or aggregate of service feeds (i.e., an aggregate feed 204) by selecting items which are, contain, refer to, or otherwise indicate video content and based on one or more other criteria, including user, Internet service, user within Internet service, source, user within source, user ratings or rankings, user comments, keywords, tags, user tags, topic, category, language, other content indicators, length, format and/or codec, fidelity (such as standard definition, 720p, 1080p), time and/or date, device 112, or location; is created from a single Internet service feed 206 or from an aggregate feed 204 by selectively narrowing the single feed 206 or aggregate feed 204 by selecting items which are, contain, refer to, or otherwise indicate one or more media types other than video or in addition to video, and based on one or more other criteria, including user, Internet service, user within Internet service, source, user within source, user ratings or rankings, user comments, keywords, tags, user tags, topic, category, language, other content indicators, length, format and/or codec, fidelity (such as standard definition, 720p, 1080p), time and/or date, device 112, or location respectively, optionally through use of a first-stage filter 212 or a second-stage filter 216 or both; or is created from a single Internet service feed 206 or from an aggregate feed 204 by selectively narrowing the single service feed 206 or aggregate feed 204 by selecting items based on other similar or dissimilar criteria respectively, optionally through use of a first-stage filter 212 or a second-stage filter 216 or both.

In the primary embodiment, the user configures which Internet service feeds 206 will be aggregated as the basis for her selective feed(s) 220 and supplies whatever credentials are required in order to enable the aggregation system 108 to collect the configured service feeds 206. The selective feed 220 is produced from one or more service feeds 206 with optional first-stage filtering 212 that are collected into an aggregate feed 204 that may have an optional second-stage filter 216. Some feeds may be specific to her, for example her Twitter™ service feed 206 (which, although it may comprise the Twitter™ messages ["tweets"] of many Twitter™ users, will contain only those of the feeds that she follows) or her email service feed 206 (inbound email messages); in many such cases, the ability of the aggregation system 108 to access these service feeds 206 will depend on the user 116 supplying her credentials, typically her username and password, for the aggregation system 108 to use. In the primary embodiment, a user 116 can provide access credentials for other Internet services 126, either permanently (allowing the aggregation system 108 to store the credentials) or temporarily (the aggregation system 108 uses the credentials for the current session but does not store them, or stores them temporarily), and can revoke access, in effect disconnecting a given service feed 206 from the aggregation system 108. Other service feeds 206 may be freely available service feeds 206, such as published service feeds 206, for example a YouTube™ channel or the RSS feed of a website; service feeds 206 such as these often will not require any credentials. In the primary embodiment, these service feeds 206 can be configured or de-configured, even though there may be no access credentials required to access, or to revoke, these service feeds 206. Other service feeds 206 may be created by, or made available to, the aggregation system 108 by querying one or more websites or other publicly available or privately available Internet content sources or services 126.

Figure 2B:
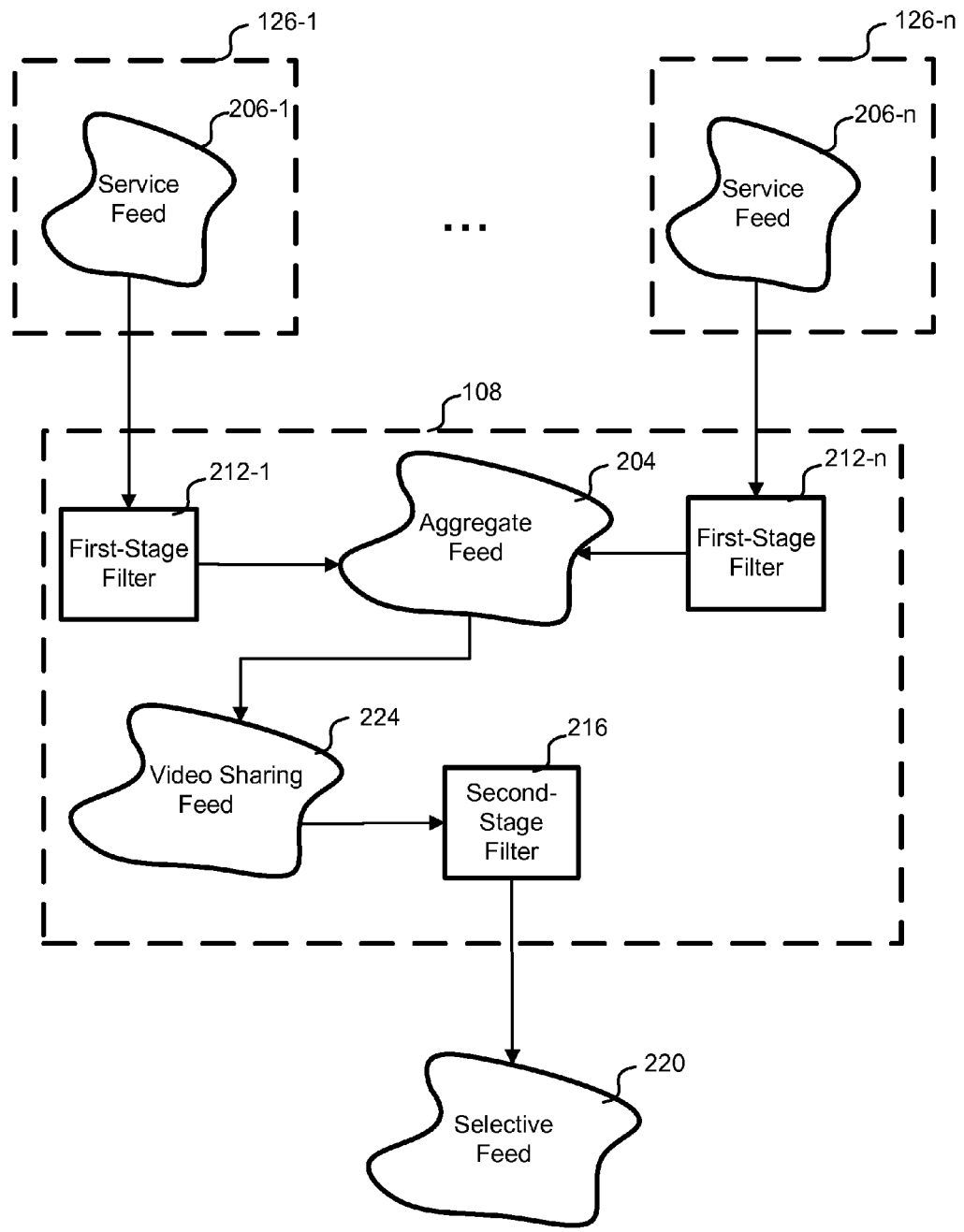

FIG. 2B shows an embodiment where an aggregate feed 204 developed by one user 116 is made available to other users of the aggregation service 108 just like any other service feed 206. Any user 116 can subscribe to another user's aggregation feed 204 as a video-sharing feed 224 so long as the original user has not marked the aggregation feed 204 as private. A user 116 can suggest their aggregation feed 204 or a video-sharing feed 224 to other users. In the example of FIG. 2B, one user has configured an aggregate feed 204 from a number of service feeds 206 with optional first-stage filtering. The aggregate feed 204 is mirrored to a video sharing feed 224 that is available to another user that optionally specifies a second stage filter 216 to create a selective feed 220.

In the primary embodiment, a user 116 creates a username and password, or uses other credentials she has created (such as her Facebook™ username and password, via Facebook™ Connect) or that are available to her (such as her employer-assigned username, password, or other credentials, or such as system-created credentials, including credentials that precisely, loosely, approximately, or otherwise identify her or associate her with one or more services or resources), to access and control her selective feed 220 (configure and reconfigure the service feeds 206 that will be aggregated to create her selective feed 220, connect and configure rendering systems 112, and perform other control and configuration functions). In other embodiments, a user 116 can use other access credentials or methods, or is required to use no access credentials or methods, to access or to control some or all aspects of her selective feed 220 through the aggregation system 108.

As described previously in the primary embodiment, some Internet service feeds 206 (which will be included in the aggregation of feeds as the basis for a user's selective feed), such as Twitter™ service feeds 206 or service feeds 206 from email accounts, may consist, in part or entirely, of items that can be identified to particular users or other sub-entities within the overall service feed 206; for example, a Twitter™ service feed 206 comprises messages that can normally be identified with one or more particular Twitter™ users, Twitter™ accounts, or Twitter™ lists. In addition, feed items from an Internet service feed 206 (which will be included in the aggregation of service feeds 206 as the basis for a user's selective feed 220), may have other optional or mandatory attributes; for example, messages in an email feed may have a priority flag, a spam flag, or one or more other attributes. In an optional aspect of the preferred embodiment, a user can further configure a specific Internet service feed 206 (which will be aggregated as the basis for a user's selective feed 220) to include or exclude feed items from aggregation into the basis for the user's selective feed 220, based on the user, account, list, entity, or other attribute or characteristic of items in the Internet service feed 206.

In the primary embodiment, the aggregation system 108 is implemented as an Internet service and supports two or more users. Accordingly, in the primary embodiment the aggregation system 108 collects Internet service feeds 206 as configured for each one of the multiple users 116 of the aggregation system 108, and selectively narrows the aggregated feeds 204 and/or video sharing feeds 224 into one or more selective feeds 220 for each user. In other embodiments, the system 100 is implemented as an Internet aggregation service 108 that supports only one user 116; is implemented as software deployed on one or more user devices or rendering systems 112 and supporting one or more users 116 of those devices 112; is implemented as software deployed in an Internet network supporting one or more users 116; or is implemented as a feature of another Internet service.

Figure 2C:
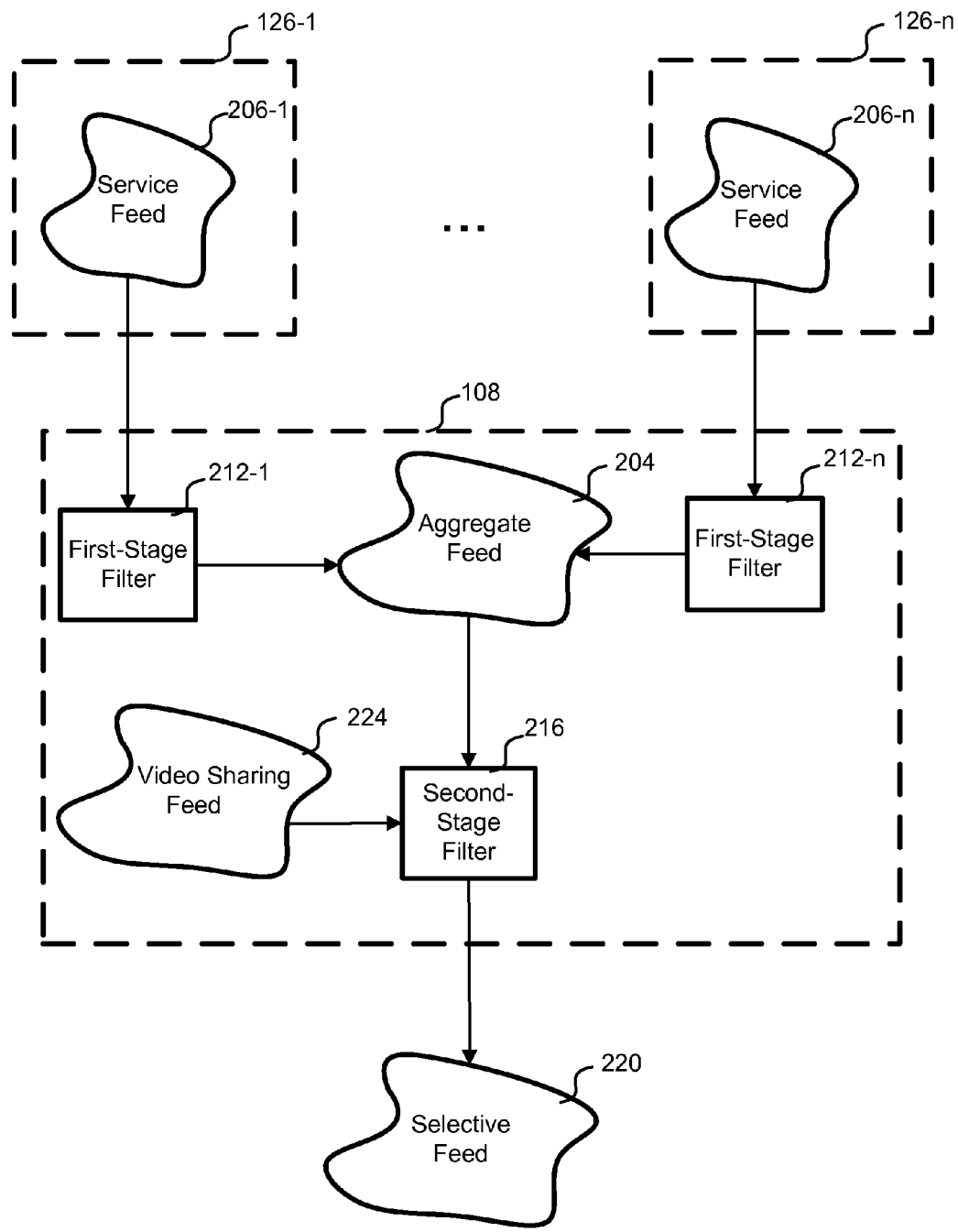

With reference to FIG. 2C, another embodiment of a diagram showing creation of a selective feed 220. In this embodiment, the selective feed 220 is a function of a video-sharing feed 224 formulated by another user and an aggregate feed 204 designed by the user. A second-stage filter takes the combination and may select in, or filter out, certain parts of the feed based upon a criteria specified by the user. The selective feed 220 could include any number of video-sharing feeds for optionally combining with an aggregate feed 204. The user could avoid specifying an aggregate feed 204 in other examples solely relying upon one or more vide-sharing feeds 224 to create her selective feed 220.

In the primary embodiment, some service feeds 206 configured for aggregation may overlap (e.g., if a popular celebrity is followed on Twitter™ by more than one user of the system); in this case, the service feed 206 configured for aggregation is only obtained once, and can be simultaneously, synchronously, asynchronously, or discontinuously used (or re-used) as the basis for the other users 116 who also have configured that feed for aggregation. In this fashion, the aggregation system 108 of the primary embodiment is efficient in its use of resources and avoids duplicate or repetitive processing. Reuse may even be used where credentials are used by one user for a service feed 206 that will be used for another user.

In other embodiments, some or all of any overlapping service feeds 206 configured for aggregation are obtained separately for some or all users that have configured that service feed for inclusion in their aggregation feeds 204. Where credentials are required, service feeds 206 could be kept separate and retrieved in duplicate from the Internet service 126. Separation could be done in some embodiments regardless of whether credentials are required.

In the primary embodiment, optionally some service feeds 206 that a user 116 configures for aggregation can be provided by the Internet service 126 individually for that user 116, so that some or all users 116 who have configured that service feed 206 for inclusion in their aggregate feed 204 receive personalized, partially personalized, unique, partially unique, or potentially unique selective feeds 220 that are specific to them or that are created expressly for them. In the primary embodiment, the user 116 is identified via a user ID associated with the aggregated feed 204 that she provides to the aggregation system 108, and that the aggregation system 108 passes to the Internet service 126 of the service feed 206 to be aggregated, enabling that Internet service 126 to configure and return, or otherwise send, a service feed 206 customized for that specific user 116. In this optional aspect of the primary embodiment, the user 116 also provides a password, so that the user 116 can be authenticated to the Internet service 126. In another embodiment, a password is not required.

In other embodiments, the user 116 is identified by any of, all of, or any combination of: a user ID, with or without a password; association with a specific device 112, device identifier, MAC address, or other attribute or data element associated with a device 112; association with a network address, network identifier, telephone number, or other attribute or data element associated with a network; association with content, a set of content, a pattern of content viewed, a content access characteristic, a set of content access characteristics, or a pattern of content access characteristics; association with a stored identifier, such as an Internet browser cookie, a Flash™ local shared object, or a similar file; association with a derived identifier, such as a device fingerprint comprising one or more aspects of the user's device and/or device software; association with biometric information; association with a usage pattern or characteristics; or association through another method of identifying a user or a user's association with a feed provider.

In the primary embodiment, while most service feeds 206 configured for aggregation are content feeds, additional feeds can optionally be configured for aggregation that provide data, sound, music, or other information, rather than video content, to the aggregation system 108. This data or other information can be used by the aggregation system 108 in the optional creation of algorithmically created, filtered, or alternatively sequenced feeds; for example, a data feed of a user's fantasy sports league rosters could be configured for aggregation, and the aggregation system 108 could then use the information it receives about the user's fantasy sports roster as a basis for identifying items for, filtering items contained within in, or alternatively sequencing the items in, the user's selective feed 220; in this optional embodiment, if and as the provided data or other information changed, the content of, filtering of, or sequencing of the items contained in the selective feed 220 would change accordingly.

Figure 3:
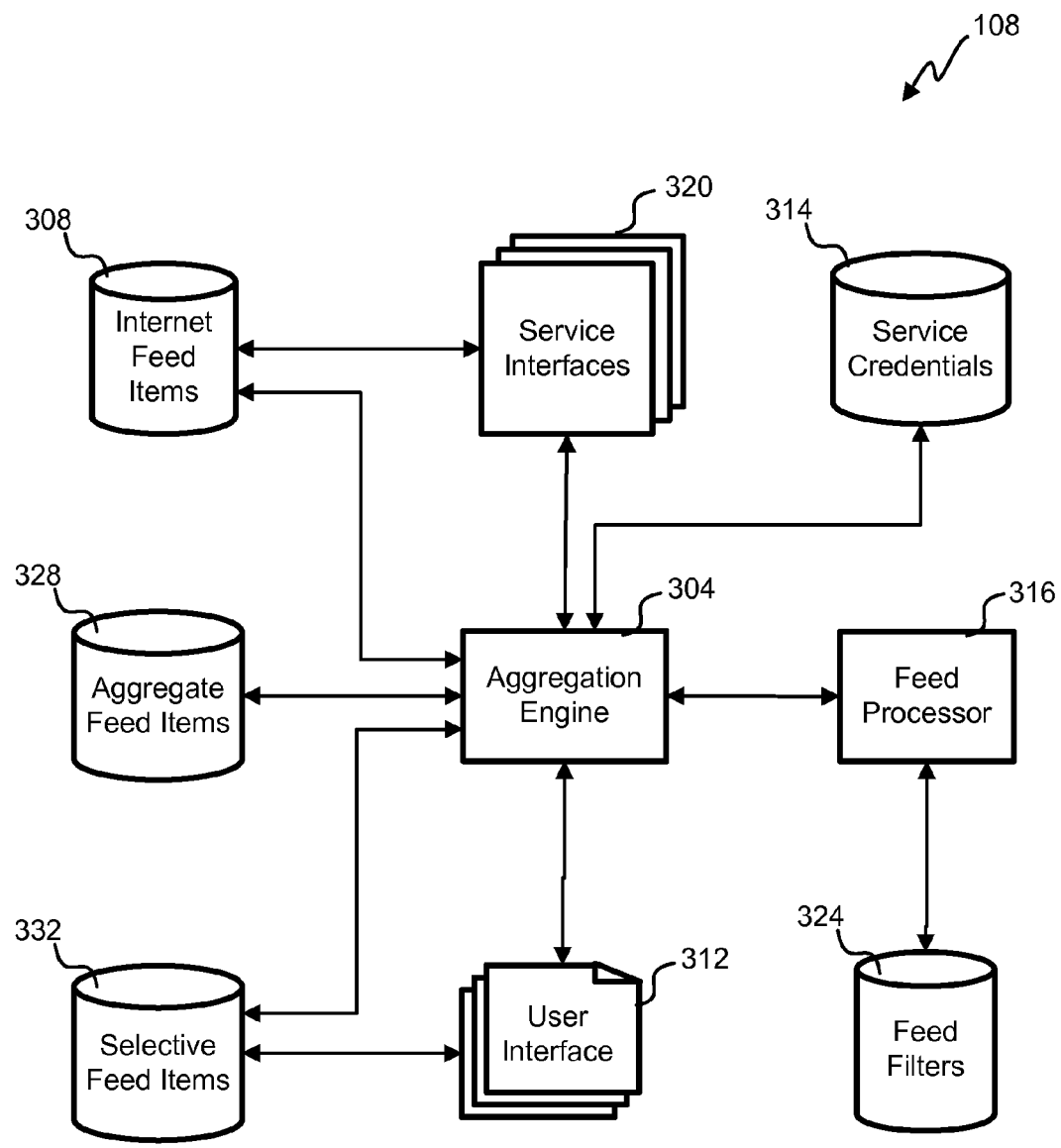
FIG. 3 depicts a block diagram of an embodiment of an aggregation system.

Referring next to FIG. 3, a block diagram of an embodiment of an aggregation system 108 is shown. There are various stores of information that may be in a database, file system and/or memory data structure, specifically, Internet feed items 308, aggregate feed items 328, selective feed items 332, service credentials 314, and feed filters 324. The information in the various stores can be combined into a single store or divided between a number of stores at a number of locations. The aggregation system 108 includes application software running on one or more hardware servers in one or more locations.

The aggregation engine 304 manages processing of information within the aggregation system. Service interfaces 320 periodically check the various Internet services 126 for new Internet feed items 308. Service credentials 314 are stored when and if the service credentials 314 are provided by users 116 and used by the service interfaces 320 where required by the Internet services 126. Internet feed items 308 are processed and stored. In some cases, Internet feed items 308 can be pushed to the aggregation engine 304 without the need to query for Internet feed items 308 by the Internet services 126.

In another embodiment, one or more Internet services 126 send, transmit, or otherwise provide Internet feed items 308 to the aggregation system 108, accessing an Application Programming Interface (API) or other interface mechanism to provide feed items, associated content, metadata, extracts or highlights, and any other information related to the service feed 206 or to individual Internet feed items 308 in the service feed 206.

There can be first-stage filters 212 and second-stage filters 216 stored as feed filters 324. The feed processor 316 performs standard filtering to find appropriate feed items, but can also apply the first-stage 212 and second-stage filters 216 as specified by the users 116. The Internet feed items 308 are organized by their source Internet service 126, category, subcategory, subject, topic or topics, tag or tags, genre, content rating, reviewer rating, popularity, and/or other factors. The aggregate feed items 328 are an aggregation from multiple service feeds 206 specified by a user after any feed filter 324 is applied by the feed processor 316. The selective feed items 332 are further filtered by the feed processor 316 using any second-stage filters 216.

Filters, including first-stage filters 212 and second-stage filters 216, or other filters, can be absolute or can be indicative of proportion or relative weight or degree, or can combine both. Thus, a filter applied to the aggregate or video sharing feeds 204, 224 of one user could completely block, or always include, inclusion in the selective feed 220 or a subset of the selective feed 220 those feed items 328, 332 matching the specified criteria, whereas the filter applied to the feed 204, 224 of a second user could operate to reduce the number of such feed items 328, 332, but not completely block such feed items 328, 332, or operate to increase the proportion of such feed items 328, 332, but not always include such feed items 328, 332, in the selective feed 220 or a subset of the selective feed 220 of that second user, and whereas the filter applied to the feed 204, 224 of a third user could operate to change the position or sequence of feed items 328, 332 matching the specified criteria in the selective feed 220 or a subset of the selective feed 220 of that third user. For example, in a user interface, such filters could be visually presented to a user as a "slider" bar, where the far left position means "always include," the far right position means "always exclude," and positions between the far left and far right mean graduated degrees of inclusion, importance, or priority.

Once a service interface 320 has found an Internet feed item 308, it is processed to determine included video or content link, feed service source, description of the video or content, any reviews or rankings, user comments, related article(s) etc. In the various stages of processing, all the information that comprises the Internet feed item 308 need not be replicated. The aggregate feed 204 can be a list of identifiers that specify which Internet feed items 308 to include. Similarly, the selective feed can be a list of the Internet feed items 308 that have not been filtered out and are specified for inclusion for one or more users 116.

The user 116 interacts with a user interface to configure the aggregation system 108. An account is created through the user interface where service feeds 206 are specified, filtering, credentials, etc. Additionally, the user 116 can authenticate herself with the aggregation system 108, for example, with a user name and password or with other credentials. Content pages are supplied through the user interface 312 to display the selective feed items 332. The selective feed items 332 can be organized by oldest items, newest items, most highly reviewed, popularity, unviewed items, or any other criteria or combination of criteria.

Figure 4A:
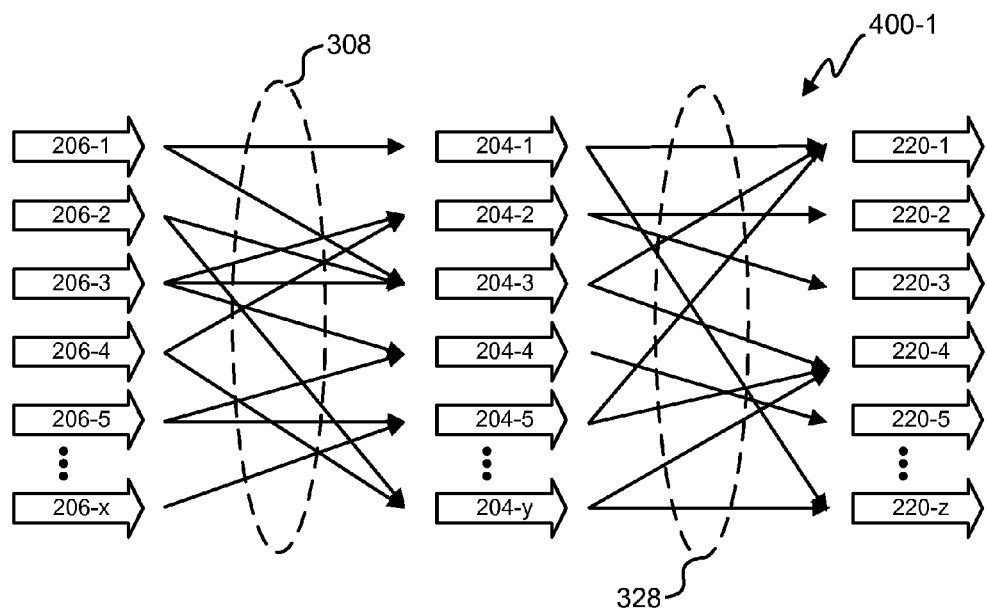
FIGS. 4A and 4B depict diagrams of embodiments that illustrate the logical flow of feeds.

Referring next to FIG. 4A, a diagram 400-1 of an embodiment illustrating the logical flow of feeds is shown. In this embodiment, there are x service feeds 206, y aggregate feeds 204 and z selective feeds. The arrows show how service feeds 206 are typically logically combined into aggregate feeds 204 and optionally logically combined into selective feeds 220. For example, a first service feed 206-1 is the sole contributor to a first aggregate feed 204-1. The first, third and fifth aggregate feeds 204-1, 204-3, 204-5 are identified by the user 116 to be combined into the first selective feed 220-1. In another example, the third and fifth service feeds 206-3, 206-5 combine into the fourth aggregate feed 204-4 before being the sole contributor to the fifth selective feed 220-5.

Figure 4B:
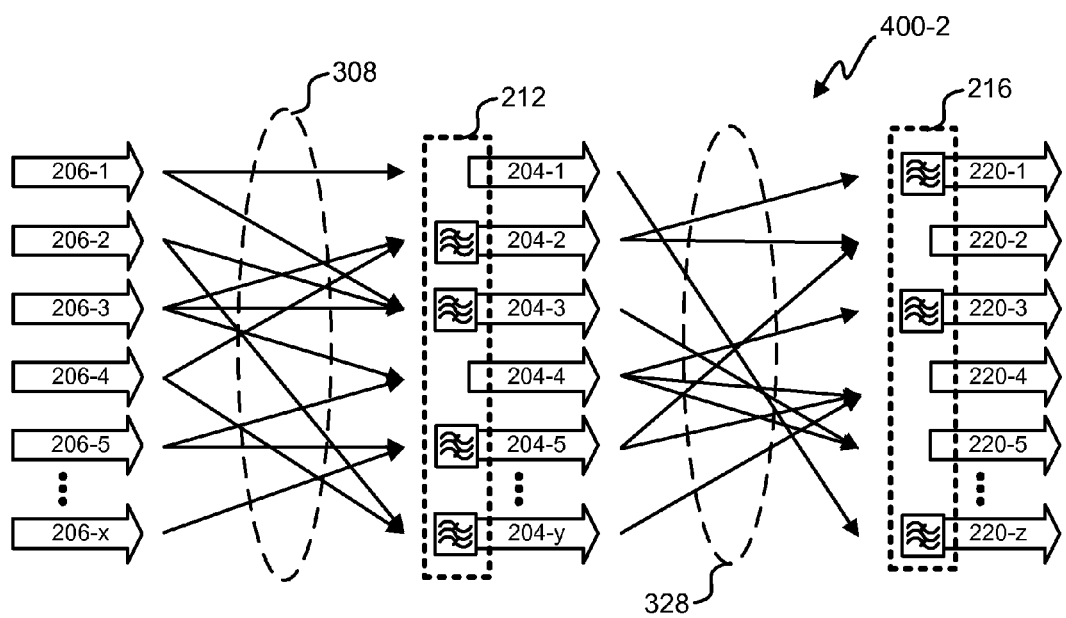

With reference to FIG. 4B, a diagram 400-2 of an embodiment illustrating the flow of feeds is shown. This embodiment adds user-defined filtering through first-stage filters 212 and second-stage filters 216. These filters are in addition to standard filters that screen for feed items that are of a particular type, for example, video feed items are screened to exclude items that have no video. In one example, the fifth service feed 206-5 is provided to fourth and fifth aggregate feeds 204-4, 204-5. A first stage filter 212 on prior to the fifth aggregate feed may select for, or screen out, any Internet feed items 308 relating to a particular subject or with a particular characteristic, for example, HD video or with a keyword or tag of "Charlie Sheen". In another example, the second aggregate feed 204-2 is provided to both the first and second selective feeds 220-1, 220-2 with only the second selective feed 220-2 filtering the input aggregate feed items 328.

Figure 5:
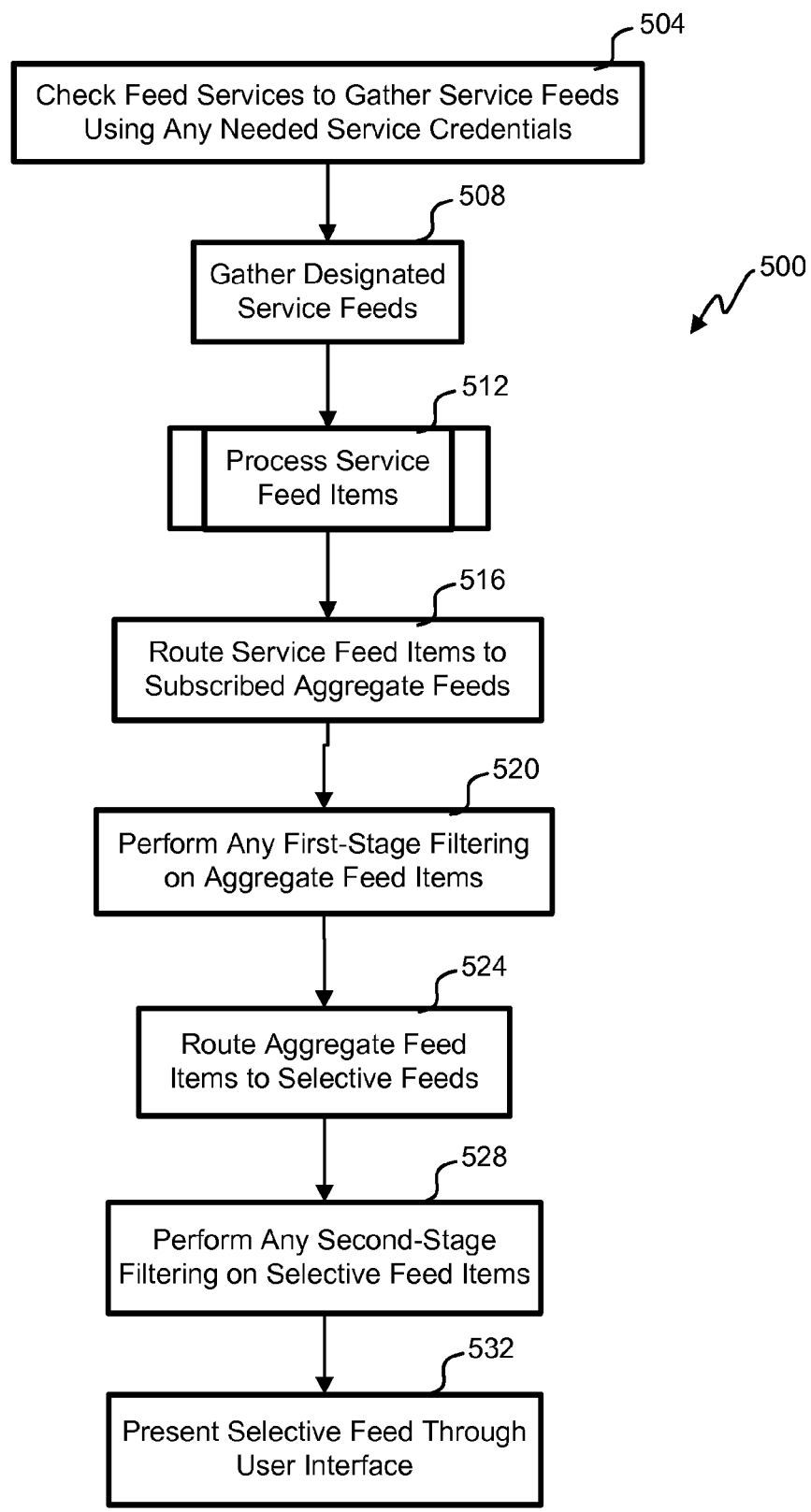
FIG. 5 illustrates a flowchart of an embodiment of a process for gathering feed items.

Referring next to FIG. 5, a process 500 for gathering feed items is shown for the primary embodiment. The depicted portion of the process begins in block 504 where the service interfaces 320 gather Internet feed items 308. Any needed service credentials 314 are used to get access to the service feeds 206. In block 508, the service feeds 206 chosen by the various users are gathered by the service interfaces 320. Each service feed 206 could be checked periodically for new Internet feed items 308. Processing is performed on the Internet feed items 308 in block 512.

Various users 116 have subscribed to the various service feeds 206. In block 516, the processed Internet feed items 308 are routed to the subscribed aggregate feeds 204. Any first-stage filter 212 specified by the user is performed on the Internet feed items 308 before they become part of the aggregate feed 204 in block 520. The aggregate feed items 328 are routed to selective feeds 200 that have subscribed in block 524. Any second-stage filter 216 is applied on the selective feed items 332 in block 528. The user 116 periodically will access the aggregation system 108 to view the selective feed 220 through the user interface 312.

Figure 6:
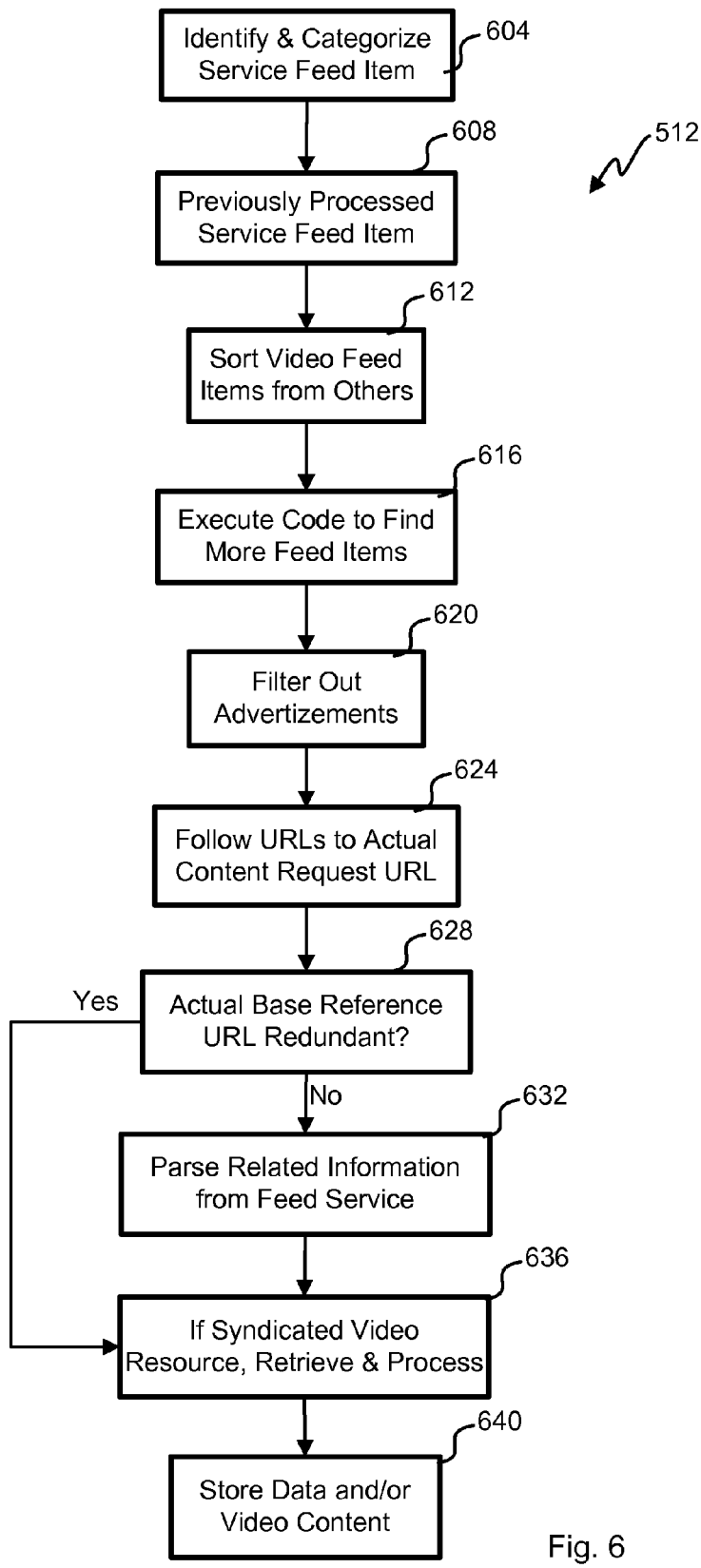
FIG. 6 illustrates a flowchart of an embodiment of a process for processing a service feed.

With reference to FIG. 6, a process 512 that fixes the service feed 206 is shown. The aggregation system 108 determines whether an aggregate feed item 328 from an aggregate feed 204 is itself, or references or includes within it, video content, and if the aggregate feed item 328 is or does, processes the aggregate feed item 328, by any of, some of, or all of the following blocks, depending on the requirements presented by the aggregate feed item 328 from the service feed 206, and executed in any order as determined by the requirements presented by the aggregate feed item 328. The depicted portion of the process 512 begins in block 604 where the aggregation engine 304 identifies and categorizes the Internet feed item 308 and extracts available characteristics of the Internet feed item 308, e.g. any available identifying, classifying, temporal, or system-related characteristics of the Internet feed item 308.

In block 608, the aggregation engine 328 determines whether the Internet feed item 308 has been previously processed, and if it has, how recently and in what context. Next, it is determined whether an Internet feed item 308 is itself a video resource. The aggregation engine 328 determines whether an Internet feed item 308 that is not a video resource is a web page, RSS feed, XML file, or other data type that potentially contains within it URLs that are video resources or that iteratively require further processing in block 612. Embedded executable code contained within the resource is executed in block 616, such as Javascript™ contained with a web page, to obtain content that is normally activated within that resource by a browser or other software client's execution of such embedded executable code, and further processes the content thereby obtained. In block 620, it is determined whether a video resource URL or other resource URL is content, or is a URL for an advertisement (either video or non-video); and if it is a URL for an advertisement, ignores it.

A URL in an Internet feed item 308 can be redirected and/or rewritten when activated. In block 624, it is determined whether a URL is a shortened URL, and if it is, issues an HTTP (or other appropriately formatted request) for that URL to obtain the actual base reference URL for further processing. It is determined whether the base reference URL has previously been processed in block 628, and if it has, determines whether a modification, creation, or expiration date parameter is associated with the base reference URL, and if one is available, determines whether it indicates that the resource identified by the base reference URL has been changed, or has not been changed, since the base reference URL was previously processed. Where the base reference URL was not previously processed, the aggregation engine 328 parses the surrounding resource to obtain metadata, such as dates, times, proper names, and other metadata, that is potentially relevant to, associated with, or descriptive of, the video resource in block 632. The aggregation engine 328 optionally parses the surrounding resource to obtain user comments, "likes," ratings, and other user feedback or other content. The aggregation engine 328 optionally associates data obtained from the surrounding resource with the base reference URL or base video object, in order to aggregate data obtained from multiple surrounding resources in which a particular base reference URL or base video object appears.

Where a base reference URL is available for the URL, such as may be the case for syndicated content, the aggregation engine identifies whether a base reference video object is available for a video resource identified by a URL. In block 636, a syndicated video resource that has not been previously stored, is stored. Optionally, one or more short highlights of the video object are extracted and stored; in the current implementation of the primary embodiment, a single 15 second highlighted is extracted and stored. Optionally, the video resource, the extracted highlight(s), or both (all) are transcoded or otherwise processed into one or more other formats, codecs, bitrates, containers, or forms. The aggregation engine stores and associates the data and objects obtained via this process 512, keyed at least by the item processed and by the video resource as a service feed item in block 640.

In the primary embodiment, the aggregation system 108 optionally eliminates duplicate video items (i.e., items that appear in more than one of the service feeds 206 aggregated for one or more users 116), while preserving the selective feed item's 332 presence in any of the selective feeds 220, or any of the filtered or narrowed views of any of the selective feeds 220. In the primary embodiment, the user 116 can also add a resource or item to the aggregation system 108, so that the video will be included in the user's aggregate feeds 204 and processed to derive the user's selective feed 220, by providing the resource's URL, embed code, or other identifier to the aggregation system 108; that item is processed as if it were an item obtained from a service feed 206.

In an optional aspect of the primary embodiment, some Internet services 126 are blocked by the aggregation system 108, so that a user 116 cannot configure such Internet service 126 for aggregation, cannot add an Internet item 308 associated with that Internet service 126 to the aggregation system 108, or otherwise designate content from that Internet service 126 for incorporation into the aggregation system 108; this optional aspect of the primary embodiment can be configured to prevent the aggregation system 108 from accessing and/or incorporating content associated with, or obtained from, Internet services 126 that have been identified as being Internet services 126 that consist partially, predominately, or entirely of content that is undesirable, prohibited, illegal, pirated, unlicensed, copied, or otherwise objectionable. In another embodiment of this optional aspect, some Internet services 126 are blocked by the aggregation system 108 for some users 116, based on criteria associated with users 116 or rendering devices 112, or other criteria. In another embodiment of this optional aspect, some or all Internet services 126 are configured for content review and each feed item 332 (including related or associated content) is inspected for a digital watermark, digital fingerprint, audio content match, or other content match to determine whether the specific feed item 332 and its related or associated content is permitted or blocked.

Figure 7A:
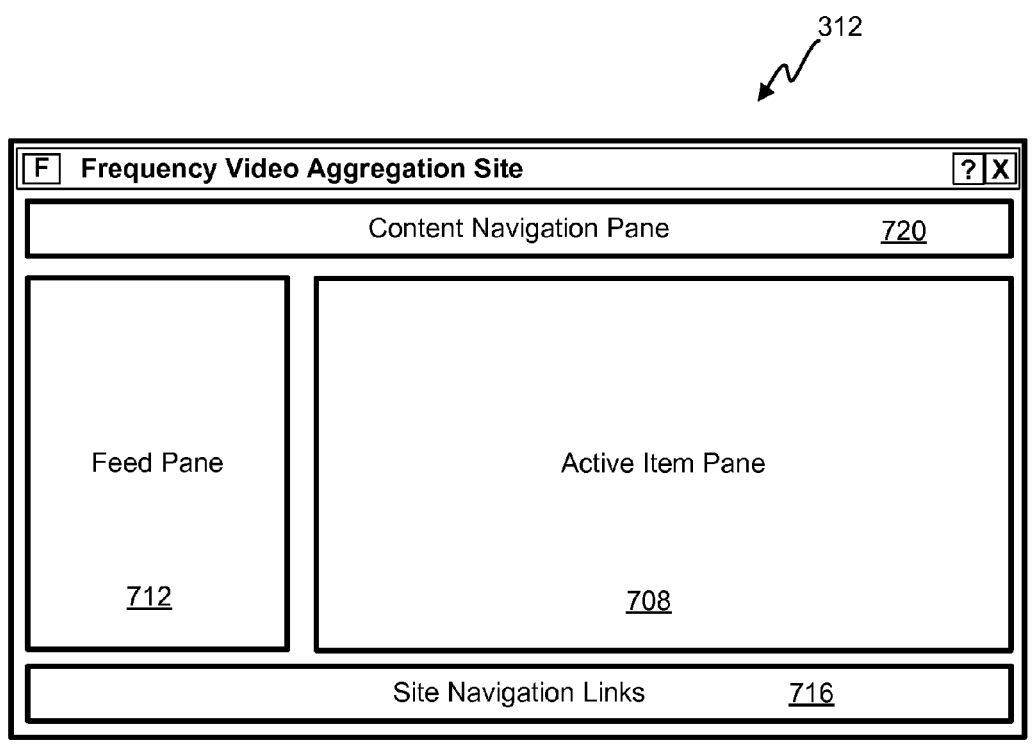
FIGS. 7A, 7B and 7C depict an embodiment of user interface to the aggregation system.
Figure 7B:
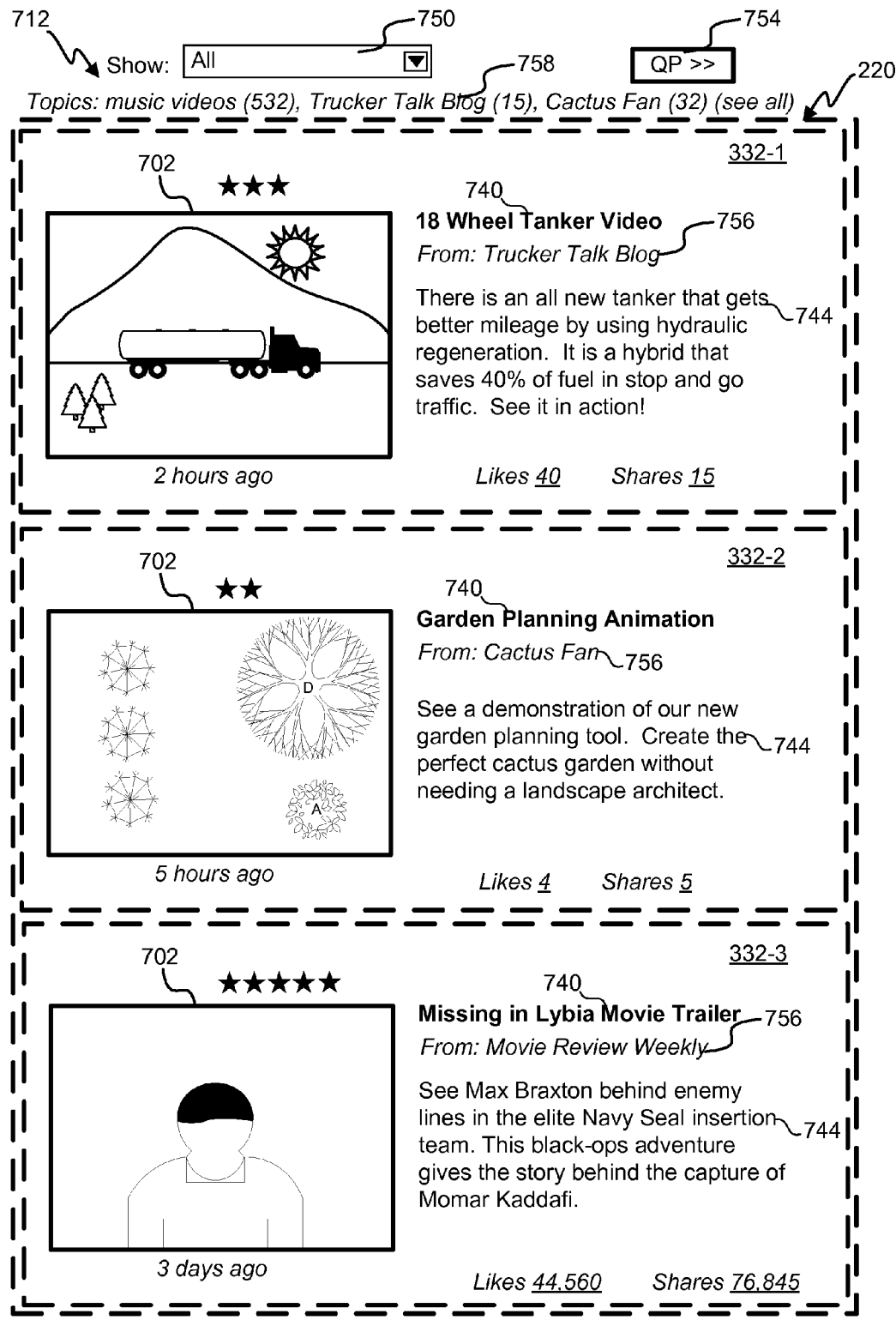
Figure 7C:
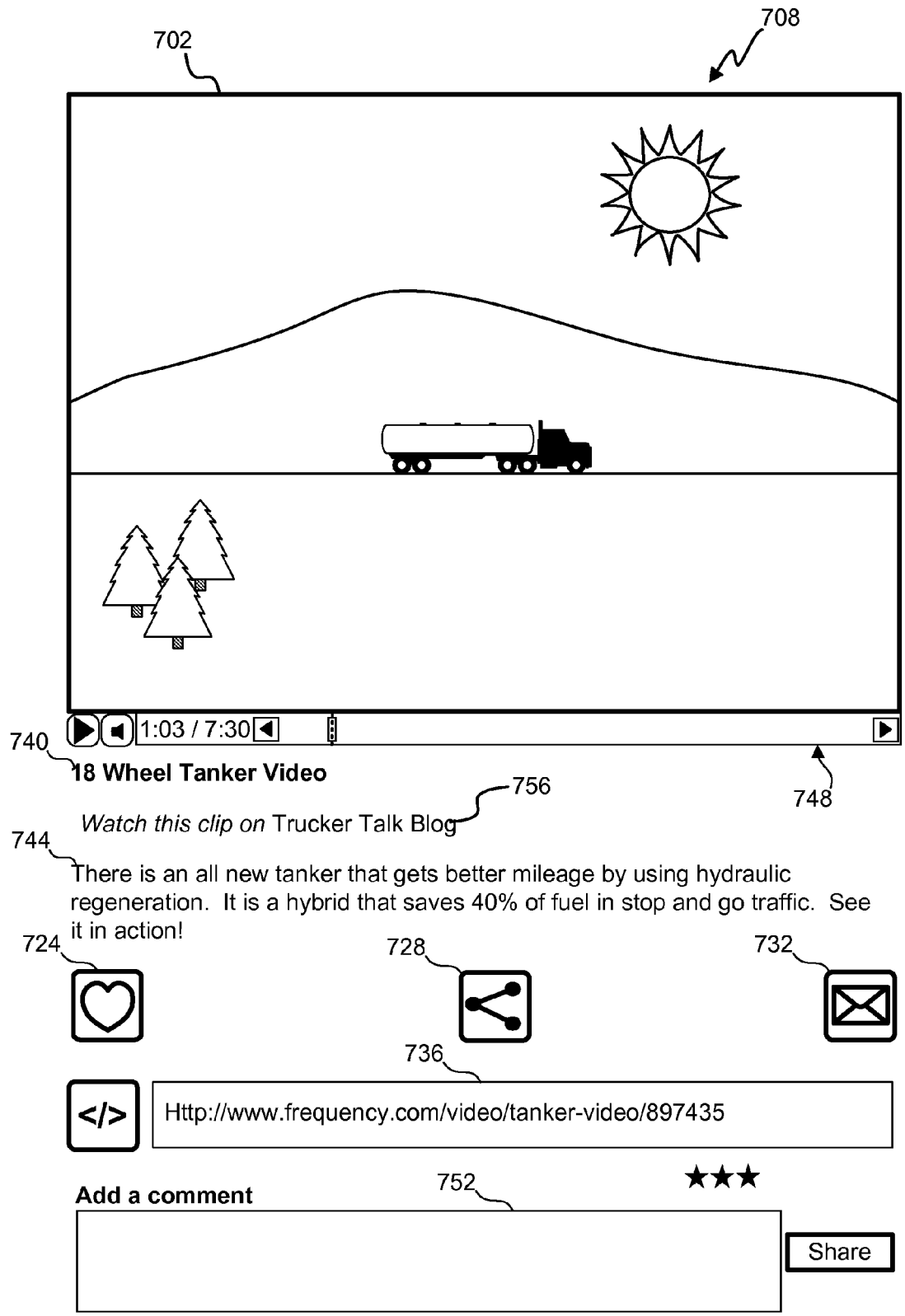

Referring next to FIGS. 7A, 7B and 7C, an embodiment of an user interface 312 to the aggregation system 108 is shown. In the primary embodiment, the user interface 312 for a full screen (as opposed to mini) browser-based user 116 who is recognized by the aggregation system 108 comprises a content navigation pane 720 with navigational and other controls across the top of the screen, a presentation of the user's selective feed running in a feed pane 712 beneath the content navigation pane 720 and down the left side of the screen, an active item pane 708 for video playback underneath the overall controls on the right side of the user interface 312, an information display showing information (i.e., title 740, source 756 and description 744) about the video underneath the video window 702, and a comment entry field 752 and sharing controls 724, 728, 732 beneath the information display.

In an optional aspect of the primary embodiment, a visual user interface for a full screen browser-based user is a video playback window 702 embedded in a web page published by a party other than the primary embodiment aggregation system 108. The embedded user interface could also include a feed pane 720 and/or a content navigation pane 720. Other embodiments could include a feed pane 712 that is overlaid or replaced by a video playback window 702 when one selective feed item 332 is chosen.

In another optional aspect of the primary embodiment, one or more data elements or types related to each selective feed item 332 is presented from some or all of the Internet services 126 associated with the service feeds 206 in which the selective feed item 332 was found, for example, ratings, comments, "likes," shares or other such information about a selective feed item 332. In yet another optional aspect of the primary embodiment, one or more data elements or types related to each selective feed item 332 is consolidated from some or all of the Internet services 126 associated with the service feeds 206 in which the selective feed item 332 was found, for example, "likes" or shares of a feed item 332 are aggregated from multiple Internet services 126, or ratings of a feed item 332 are averaged or otherwise mathematically consolidated from multiple Internet services 126.

In another optional aspect of the primary embodiment, the visual interface 312 and controls are adapted to the display characteristics and data input/output capabilities of an Internet-connected television, with the video playing in the full screen, or nearly the full screen, of the television display with translucent information related to the video displayed over the video as the video playback window 702 starts and then fading-out after several seconds to provide unimpeded visual access to the video; controls, such as "skip to the next video" or "bring up the selective feed," are executed via pressing keys on the television remote. In some cases, a playback manipulation control 748 would overlay the video playback window 702 translucently when temporal manipulation of playback is performed and fade away after manipulation.

In another optional aspect of the primary embodiment, the visual user interface 312 and controls are adapted to the display characteristics and data input/output capabilities of an Internet-connected smartphone or tablet, with the video playback window 702 playing in the full (albeit, in at least some cases, physically small) screen, or nearly the full screen, of the smartphone or tablet, with information 740, 756, 744 related to the video displayed over the video as the video starts and then fading out after several seconds to provide unimpeded visual access to the video; controls, such as "skip to the next video" or "bring up the selective feed," are executed via gestures made by touching the screen, or by pressing keys on a soft keyboard invoked to appear on the screen, or by pressing physical keys on the smartphone or tablet.

In another optional aspect of the primary embodiment, the visual user interface 312 is split between two display screens, implemented as either two display screens embedded in a single device or as two separate devices. A first display screen could be a television with the video playback window 702 being supplied by internal circuitry or a set top box. A second display screen would be used to provide the feedback pane 712, content navigation pane 720, content information 740, 756, 744, playback manipulation control 748, comment entry field 752, sharing controls 724, 728, 732, and/or embedded link control 736. The second display screen could be an intelligent remote control, a smart phone, a PDA, a personal computer, a tablet computer, etc. Communication could be directly from the second display screen to the first display screen or through an intermediary such as a set top box or through the aggregation system 108.

In another embodiment, the visual interface comprises multiple columns of selective feed items 332, all of which may be sorted according to the same criteria, or some or all of which may be sorted according to separate criteria, implemented as multiple feed panes 712 or as multiple columns of information in a single feed pane 712. In this embodiment, one or more feed panes 712 would compress, dissolve or fade, shift to another position, or otherwise visually give way to the active item pane 708 when a selective feed item 332 is selected for playback.

In the primary embodiment, the selective feed 220 is presented to the user 116 in reverse chronological timeline sequence, that is, with the most recent item first (e.g., at the top of a list of items) as shown in FIG. 7B. In other embodiments, the selective feed 220 is presented to the user 116 in chronological timeline sequence; in modified reverse chronological timeline sequence where selective feed items 332 are grouped together, the selective feed items 332 within groups 758 are presented in chronological timeline sequence and the groups 758 are presented in reverse chronological timeline sequence; in modified chronological timeline sequence where selective feed items 332 are grouped together, the selective feed items 332 within groups 758 are presented in reverse chronological timeline sequence and the groups 758 are presented in chronological timeline sequence; or in a sequence determined without regard to time order. Optionally, the selective feed 220 may also be presented in one or more filtered or alternative sequences, for example any of, all of, or any combination of:

in reverse chronological or other sequence, filtered to show only the items from a particular aggregated feed or topic 758 (e.g., the user's Twitter™ feed, Facebook™ feed, music video feed, etc.), or only the items associated with a particular entity within a feed (e.g., a particular Twitter entity followed by the user), or only the items from a particular source (e.g., BBC News™), or only the items that are associated with a particular topic, proper name, or other identifier or attribute;

in reverse chronological or other sequence, filtered to show only the items from one or more particular categories 750 (such as News, Sports, Celebrities, or Finance); or, within that category, in reverse chronological or other sequence, filtered to show only the items from a particular aggregated feed, or only the items associated with a particular entity within a feed, or only the items from a particular source, or only the items that are associated with a particular topic, proper name, or other identifier or attribute;

in a sequence, determined entirely or in part by one or more algorithms, and based on any of, all of, or any combination of: filtering out duplicate, nearly duplicate, loosely duplicate, repetitive, nearly repetitive, or loosely repetitive items; identifying more or less popular, or more or less relevant, items as determined by the total user population or by a subset of the user population, based on the viewing (including started views, partially completed views, completed views, and/or repeated views), liking, sharing, saving, and other behavior of the other users or subset of users, and where the subset is optionally affiliated with, socially connected to, comparable to, loosely or closely temporally coincident with, associated through actual, geographic, or network location with, directly or indirectly linked to, or otherwise related to the user, or unrelated to the user;

in a sequence, determined entirely or in part by one or more algorithms, and based entirely or in part on items selected based on the user's current or past actions or behavior, including any of, all of, or any combination of: the user's service subscriptions; the specifics of the user's service feeds; the user's viewing behavior, including started views, partially completed views, completed views, and/or repeated views; the user's likes, shares, saves, and saves for later viewing; the user's search or other queries; the user's added resources and items; the user's actions or behavior associated with a device or devices 112, category of devices, or attribute(s) or characteristic(s) of a device or devices, or based on or associated with the user's comparative actions or behavior associated with a device or devices 112, category of devices, or attribute(s) or characteristic(s) of a device or devices as compared to the user's actions or behavior associated with another device or devices 112, category of devices, or attribute(s) or characteristic(s) of a device or devices; and/or other user actions, inactions, or behavior(s);

in a sequence determined entirely or in part based on information contained in one or more non-content feeds associated with the user, or determined entirely or in part by one or more algorithms based entirely or in part on information contained in one or more non-content feeds associated with the user; and/or in a sequence determined entirely or in part by one or more algorithms that increases, decreases, achieves a minimum, or limits the maximum of, the number of consecutive items and/or the proportion of items within an overall range or group of items, from one source or feed, or from a group of sources or feeds, or from a type or category of sources or feeds, or with one or more other attributes.

In the primary embodiment, the videos are played sequentially in the order in which they are presented to the user 116 in the selective feed 220, and if the selective feed 220 is presented in a filtered or narrowed ordered, then in that filtered or narrowed sequence. Thus, in the primary embodiment and on a full screen browser-based device interface (e.g., a PC), the user can see the selective feed 220 on the left in a feed pane 712, which feed item 332 is currently playing, which feed item(s) 332 recently played, and which items are coming up for playback with the feed items 332 arranged in the feed pane 712 as a vertically-rotating carousel. In the primary embodiment, each item in the running selective feed 220 presented on the left hand side feed pane 712 of the user interface screen 312 contains descriptive information about the item, such as the title 720, description 744, source 756, number of likes and shares, optionally other rating information, and optionally other information; this enables the user to see such information about feed items 332 not currently playing in the video playback window of the active item pane 708. The user 116 can manually select feed items 332 within the selective feed 220 as presented, typically by pointing and clicking on a feed item 332, at which point the feed item 332 begins playing in the video playback window of the active item pane 708, which allows the user 116 to directly access any feed item 332 on demand and begin playback as the feed items 332 are rotated through a list of the selective feed 220 arranged in a vertical carousel within the feed pane 712. The user 116 can also select the next sequential video in the list of the selective feed 220 by clicking on a button or slider control that advances playback to the next feed item 332, which stops playback of the current feed item 332 and begins playback of the next feed item 332 in sequence. At the conclusion of any feed item's 332 playback, when playback of that feed item 332 reaches the end, the next feed item 332 in sequence automatically begins playback in one embodiment. Other embodiments could use a Play control to begin playback of the next feed item 332 after the current feed item 332 is done playing.

In an optional aspect of the primary embodiment, automatic sequential playback continues indefinitely, until the end of the selective feed 220 is reached; in this manner, a very long continuous period of video content playback—hours, days, weeks, months, limited only by the length of the history of the user's selective feed 220—can in principle be offered to the user 116, with as much or as little action, and resulting control, as the user desires. In another aspect of the primary embodiment, automatic sequential playback is paused or stopped by the aggregation system 108 after a predetermined point or range, based on a number of videos played, a total time amount of video played, a time interval that has elapsed since the last user-initiated action, the age of an item in the user's selective feed, or other criteria; automatic sequential playback may then be resumed upon user initiation or if the user responds to a prompt or system request or dialogue.

In an optional aspect of the primary embodiment, the user 116 can perform one or more of the following actions for some or all of the feed items 332 in her selective feed 220:

"Like" a feed item, which marks it as a feed item she liked;

rate a feed item, which marks a feed item with her rating, which may be positive or negative or either, and which may have any range desirable, such as a scale of stars;

save a feed item, which marks it as a feed item she has saved;

save a feed item for later viewing, which marks it as a feed item she has saved and would like to view again, including on a different device 112, and including on a specific device or group of devices 112;

automatically save feed items, including any variation or specific method of saving feed items, based on criteria she specifies, such as any of, all of, or any combination of, feed items from one or more selective feeds, feed items associated with one or more users or sources, feed items associated with one or more topics or categories of topics, length of feed item, content of feed item, category of feed item, or other feed item attributes;

manually or automatically terminate the saving of a saved feed item, including based on any of, all of, or any combination of elapsed interval since saved, elapsed interval since last viewed, elapsed interval since last shared or liked, elapsed interval since last action by another person associated with the user, selective feed(s) associated with the feed item, user(s) associated with the feed item, sources associated with the feed item, topics or categories of topics associated with the feed item, length of feed item, content of feed item, category of feed item, or other item attributes;

share a feed item with other users of the aggregation system, or to users of one or more other Internet services (which may require that she provide her user credentials for that system, if she has not already provided them), or both, or otherwise send feed items to other users of either the aggregation system or another Internet service or both;

automatically share selective feed items 332, including any variation or specific method of sharing selective feed items 332, based on criteria she specifies, such as any of, all of, or any combination of, selective feed items 332 she has liked, saved, stored, or rated, selective feed items 332 from one or more selective feeds 220, selective feed items 332 associated with one or more users or sources, selective feed items 332 associated with one or more topics or categories of topics, length of feed item, content of feed item, category of feed item, rating of feed item, or other feed item attributes;

store a selective feed item 332 to one or more devices 112, so that some or all of the content associated with that selective feed item 332, including or excluding the video content, can be viewed on that device 112 when not connected to the aggregation system 108;

automatically store selective feed items 332 to one or more devices 112, including any variation or specific method of storing selective feed items 332, based on criteria she specifies, such as any of, all of, or any combination of, selective feed items 332 she has liked, saved, shared, or rated, selective feed items 332 from one or more selective feeds 220, selective feed items 332 associated with one or more users or sources, selective feed items 332 associated with one or more topics or categories of topics, length of feed item, content of feed item, category of feed item, rating of feed item, or other feed item attributes;

comment on a feed item;

send a message in conjunction with sharing a feed item;

provide feedback to the publisher of a feed item;

place an order related to a feed item;

accept an offer provided in conjunction with a feed item;

delete a feed item from her selective feed; and/or reverse or revoke any previous action.

In an optional aspect of the primary embodiment, the sequence of feed items 332 upcoming in the user's selective feed 220 shown in the feed pane 712 is dynamically influenced, changed, or rearranged based on the user's actions as the aggregation system 108 progresses through the selective feed 220 as originally sequenced for the user 116 in the vertical carousel. For example, as previously described, in the primary embodiment the sequence of the feed items 332 in the selective feed 220 is reverse chronological timeline sequence (which in this optional aspect may be considered the original sequence of feed items 332); as the aggregation system 108 proceeds through the playback process and the user 116 watches, skips, likes, saves, or shares items in the selective feed 220, in this optional aspect of the primary embodiment the aggregation system 108 dynamically adjusts the sequence of upcoming feed items 332 in the user's selective feed 220 to reflect these actions so that the user 116 sees more items that share various characteristics with the feed items 332 she has liked or shared or saved for later viewing, or fewer items that share various characteristics with the feed items 332 she has skipped or deleted, or otherwise re-sequences the upcoming feed items 332 in the selective feed 220 based on her actions. This process can be iteratively repeated based on the user's actions as the aggregation system 108 progresses through the adjusted selective feed 220, further adjusting the sequence of feed items 332 then upcoming; similarly, based on the user's actions this process can be cancelled or reversed and the user's upcoming selective feed items 332 reverted to the original sequence.

In this optional aspect of the primary embodiment, this adjusted sequence can be presented continuously with, or as part of, or as the next part of, the user's selective feed 220, or can be presented as a separately labeled and separately selectable sequence of the user's selective feed 220. Adjustments to the user's upcoming sequence can be provided in real-time or near real-time, as the user 116 advances through, or as automatic playback advances through, the user's selective feed 220; can be effected between sessions; can be effected after a specified amount or type of amount of one or more types of user action has occurred; can be effected after two or more user actions have occurred in sequence, consecutively, within a specified time period, within a specified number of user actions, in a particular order or in no particular order, or otherwise have occurred; or can be effected after a specified level of confidence in the applicability of the adjustment(s) is reached.

In an optional aspect of the primary embodiment, the user 116 has the option of selecting regular viewing mode, which plays each video in the selective feed 220 in full as presented (that is, plays the first video, then plays the next video, then plays the next video) or can select a quick-play viewing mode activated by a quick-play control 754, which plays one or more excerpts of each video, rather than the full videos, in sequence. In this optional aspect of the primary embodiment, the excerpts may be of a specific length, may be of selectable length, may be of a length selected by the aggregation system 108, or may be of a length separately selected for each feed item 332 by the aggregation system 108 for each. In this optional aspect of the primary embodiment, the user 116 has the option of clicking on a play-in-full icon, which then initiates play of the full feed item 332 from the beginning; upon completion, the aggregation system 108 will stay in regular viewing mode for the next feed item 332 in the user's selective feed 220, or in another optional aspect of the primary embodiment, the aggregation system 108 will return to quick-play viewing mode for the next feed item 332. When the user 116 selects quick-play viewing mode or alters the settings (length of excerpt, etc) of quick-play viewing mode, the presentation of the user's selective feed 220 is filtered to include only those feed items 332 for which the necessary excerpt(s) is(are) available, thus presenting the user 116 a selective feed 220 that functions properly in this mode.

In another optional aspect of the primary embodiment, content publishers and/or Internet services 126 may be offered the option of prohibiting quick-play viewing mode or of specifying one or more excerpts to be presented in quick-play viewing mode. If a content publisher 126 has elected to prohibit quick-play viewing mode, when the user 116 selects this viewing mode the presentation of the user's selective feed 220 is additionally filtered to include only those feed items 332 for which the content publisher 126 has not prohibited quick-play viewing mode, thus presenting the user 116 a selective feed 220 that functions properly in this mode. If a content publisher 126 has elected to specify one or more excerpts to be presented in quick-play viewing mode, when the user 116 selects this mode the presentation of the user's selective feed 220 is additionally filtered to include only those feed items 332 for which the specified excerpt matches the quick-play viewing mode settings, or alternatively, the user's settings are overridden and the content publisher's 126 selected excerpt is presented even though it does not meet the user's quick-play viewing mode settings.

In another optional aspect of the primary embodiment, content publishers 126 may be offered the option of prohibiting quick-play viewing mode on specific devices 112 or specifying the excerpt to be used on a particular device 112 in quick play viewing mode. If a content publisher 126 has elected to prohibit quick-play viewing mode on specific devices 112, when the user 116 selects quick-play viewing, the presentation of the user's selective feed 220 is additionally filtered to include only those feed items 332 for which the content publisher 126 has not prohibited quick-play viewing mode on the device 112 the user 116 is using for playback, thus presenting the user 116 a selective feed 220 that functions properly in this mode. If a content publisher 126 has elected to specify one or more excerpts to be presented in quick-play viewing mode on a particular device 112, when the user 116 selects this mode the presentation of the user's selective feed 220 is additionally filtered to include only those feed items 332 for which the content provider's 126 specified excerpt for the device 112 being used by the user 116 matches the quick-play viewing mode settings, or alternatively, the user's settings are overridden and the content publisher's 126 selected excerpt for the device 112 being used by the user 116 is presented even though it does not meet the user's quick-play viewing mode settings.

In the primary embodiment, the selective feed 220 presented to the user 116 may optionally be modified (expanded or narrowed) based on the capabilities of the device 112 in use by the user 116 to effectively render the video content that comprises, is contained in, is referred to by, or is otherwise indicated by, the feed items 332 in the selective feed 220. In the primary embodiment, the ability to effectively render the video content is determined in absolute terms, that is, either the device 112 can render it or the device 112 cannot; in another embodiment, the ability to effectively render the video content is determined in qualitative terms, such as based on how well the device 112 can render the video content, based on the relative quality of the video playback in the context of the device's overall capabilities, or based on the relative quality of the video playback in the context of the particular user's or a typical user's normal usage of the device 112.

In an optional aspect of the primary embodiment, the selective feed 220 presented to the user 116 may optionally be modified (expanded or narrowed) based on the individual selective feed items 332 and the device 112 in use by the user 116, based on policies, attributes, or characteristics associated with the selective feed items 332, including the preferences or settings specified by any of, all of, or any combination of the producer of, publisher of, distributor of, contributor to, or other party affiliated with one or more items or the content contained in, or referenced by, one or more feed items 332, or by one or more Internet services 126 that contributed one or more items, or the content contained in, or referenced by, one or more feed items 332, to the selective feed 220. In an optional aspect of the primary embodiment, the selective feed 332 presented to the user 116 may optionally be modified (expanded or narrowed) based on the individual selective feed items 332 and the device 112 in use by the user 116, based on policies, attributes, or characteristics associated with the device 112, including the preferences or settings specified by the manufacturer of, distributor of, or other party affiliated with the device 112. In another optional aspect of the primary embodiment, the selective feed presented to the user may optionally be modified (expanded or narrowed) based on the individual selective feed items and the network or network segment to which the device 112 in use by the user 116 is attached, based on policies, attributes, or characteristics associated with the network or network segment, including the preferences or settings specified by the network or network segment operator, including a network operator, an enterprise or other organization, or an operator of a home or other premises network.

In the primary embodiment, the user 116 can view a subset of the selective feed 220 and/or playback of the video content that comprises, is contained in, is referred to by, or is otherwise indicated by, the feed items 332 in the selective feed 220 based on (including or excluding) all of, any of, or any combination of: the Internet service(s) 126 from which one or more feed items 332 were obtained; the user(s) 116 or other entity(ies) associated with the Internet service(s) 126 from which one or more feed items 332 were obtained; the source(s) where one or more feed items 332 were referenced; the source(s) where one or more feed items 332 were published; the source(s) where one or more feed items 332 were first published; one or more lists or categories of Internet services 126; one or more lists or categories of users of one or more Internet services 126; one or more lists or categories of sources where feed items 332 are referenced, published, or first published; one or more topics to which one or more feed items 332 refer; one or more categories of topics or within which one or more topics are included; one or more time ranges, timeframes, sequences, or dates; one or more ratings, either globally or within one or more Internet services 126; activity related to one or more feed items 332; or other criteria associated with one or more feed items 332.

In an optional aspect of the primary embodiment, the user 116 can attach one or more devices 112, such as connected consumer electronics equipment, video game consoles, smartphones, and other devices, to his or her user account with the aggregation system 108. In the primary embodiment, the user 116 navigates to a code available on the device 112 she desires to connect to her account, then enters that code into her account through the user interface 312. In an alternative method for connecting a device 112 to her account, the user 116 navigates to a sign-in screen on the device 112 she wishes to connect and enters her username and password, thereby signing into the aggregation service 108 from the desired device 112. Under either method, the aggregation system 108 of the primary embodiment then identifies the device type and other technical and configuration characteristics, identifies the device 112 as connected to the user's account, and provides the appropriately configured selective feed, properly formatted content items, other user interface parameters and elements, operational parameters, controls and commands, and other content and data to the device 112, and accepts data, input, and other appropriately formatted (and, if desired, authenticated) entries from the device 112. In one embodiment, a device 112 can only be attached to a single user account with the aggregation system 108; in another embodiment, a device 112 can be attached to multiple user accounts.

In an optional aspect of the primary embodiment, the aggregation system 108 determines one or more home regions, locations, or characteristics of a user 116, or of a device 112, or the combination of a user 116 and device 112, with any appropriate level or range of geographic or cultural precision, such as a global region (e.g., North America, Western Europe), continent, country, state, county, city, postal code, DMA, census tract, language, zone, or other cultural environs. The home regions, locations, or characteristics can then be used to filter, prioritize, select, or make substitutions for, some or all feed items, or versions of feed items, or versions of content associated with feed items, such as video content, presented in or with the selective feed 220 for a user 116, for example to select a version of a selective feed item 332 that is presented in a language specific to, or appropriate for, a region, location, or characteristic, or that contains a content version tailored to, or appropriate for, a region, country, or location, or substitute one such version of a selective feed item 332 for another, or as another example to filter out a selective feed item 332 that is not appropriate for, or is prohibited for legal or regulatory reasons in, a country or location. In another embodiment of this optional aspect of the primary embodiment, the user 116 can specify her home region, location, or characteristics. In yet another embodiment, the aggregation system 108 determines one or more home regions, locations, or characteristics of a user 116, the user 116 can also specify her home region, location, or characteristics, and the aggregation system 108 can determine when, under what conditions, and/or for which feed items 332 to use the home region, location, or characteristics specified by the user 116 and when, under what conditions, and/or for which feed items 332 to use the home regions, locations, or characteristics determined by the aggregation system 108. In one embodiment, the Internet service 126 can specify a home region, location, or characteristics on a per service feed 206 or per Internet feed item 308, which is communicated to the aggregation system 108 and can be used by the aggregation system 108 independently, or in conjunction with, the home region, location, or characteristics determined by the aggregation system 108, or the home region, location, or characteristics specified by the user 116, or both.

In an optional aspect of the primary embodiment, the user interface 312 of the aggregation system 108 presents the user 116 with a list of, or array, comprising one or more of the devices 112 connected to the aggregation system 108, optionally including the manufacturer, model, device type, carrier, and/or other relevant descriptive data; allows the user 116 to provide customized names or identifiers to each device 112 (such as "John's smartphone" or "Living Room TV"); enables the user 116 to manage each device 112, including to cancel the connection of that device 112 to the user's account; enables the user 116 to manage which of his or her organized feeds, subsets of feeds, lists of items, or other category or subset of feed items 332 is available on each device 112, and under what label; enables the user to identify or save feed items 332 for a specific device or devices 112, for example, while browsing the web via a web browser or while reviewing her selective feed 220 from a connected smartphone, identify or save a video for viewing on the device "Living Room TV" or on the group of devices "TVs at Home"; enables the user 116 to manage the lengths of items, content of items, category of items, or other item attributes that will determine or influence which content or feed items 332 are available on that device 112; allows the user 116 to control one connected device 112 from another, such as controlling a connected Blu-Ray player from a connected smartphone; control how one or more selective feeds 220, subset(s) of the selective feed(s) 220, or group of content or items is/are filtered and/or presented on the device or another device 112; and enables the user 116 to save, rollback changes to, or recover prior versions of, such configurations, information, settings, or controls associated with one or more devices 112.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A video processing system for providing personalized video content feeds to users from the Internet, the video processing system comprising:
a first service feed that is acquired from a first Internet service, which is accessible from the Internet, wherein:
the first service feed comprises a plurality of first feed items arranged in the first service feed serially, the first service feed includes the plurality of first feed items that each include a first separately resolvable link to another content item available from the Internet, the plurality of first feed items comprises at least one feed item that has a separately resolvable link to a video content item, and the plurality of first feed items comprises at least one feed item that has a separately resolvable link to a non-video content item;

a second service feed that is acquired from a second Internet service, which is accessible from the Internet, wherein:

the second service feed comprises a plurality of second feed items arranged in the second service feed serially, the second service feed includes the plurality of second feed items that each include a second separately resolvable link to another content item available from the Internet, the plurality of second feed items comprises at least one feed item that has a separately resolvable link to a video content item, and the plurality of second feed items comprises at least one feed item that has a separately resolvable link to a non-video content item;

an aggregation system that is configured to:

receive the first service feed and reduce the first service feed to a first subset of the plurality of first feed items that link to video content items available from the Internet, and receive the second service feed and reduce the second service feed to a second subset of the plurality of second feed items that link to video content items available from the Internet; and a selective video feed comprising a plurality of feed items that each include a link to video object available from the Internet, the selective video feed including the first subset of the plurality of first feed items and the second subset of the plurality of second feed items.

2. A method for providing personalized video content feeds to users from the Internet, the method comprising:

acquiring a first service feed, including a plurality of first feed items arranged serially that link to content objects, which are available from the Internet, from a first Internet service, and wherein the plurality of first feed items comprises at least one feed item that links to a video object and at least one feed item that links to a non-video object;

acquiring a second service feed, including a plurality of second feed items arranged serially that link to content objects, which are available from the Internet, from a second Internet service, and wherein the plurality of second feed items comprises at least one feed item that links to a video object and at least one feed item that links to a non-video object;

filtering the first service feed to a first subset of the plurality of first feed items such that the first subset is limited to those of the first service feed that link to video objects available over the Internet;

filtering the second service feed to a second subset of the plurality of second feed items such that the second subset is limited to those of the second service feed that link to video objects available over the Internet;

combining the first subset and the second subset into a video selective feed comprising a plurality of feed items that each include a link to a video object available using the Internet; and delivering the video selective feed to a user.

3. A video processing system for providing personalized content feeds to users from the Internet, the video processing system comprising one or more hardware servers configured to:

acquire a first service feed, including a plurality of first feed items arranged serially that link to content objects, which are available from the Internet, from a first Internet service, and wherein the plurality of first feed items comprises at least one feed item that links to a video object and at least one feed item that links to a non-video object, acquire a second service feed, including a plurality of second feed items arranged serially that link to content objects, which are available from the Internet, from a second Internet service, and wherein the plurality of second feed items comprises at least one feed item that links to a video object and at least one feed item that links to a non-video object, filter the first service feed to a first subset of the plurality of first feed items such that the first subset is limited to those of the first service feed that link to video objects available over the Internet, filter the second service feed to a second subset of the plurality of second feed items such that the second subset is limited to those of the second service feed that link to video objects available over the Internet, combine the first subset and the second subset into a selective feed comprising a plurality of feed items that each include a link to a video object available using the Internet, and deliver the selective feed to a user.

4. The video processing system for providing personalized content feeds to users from the Internet as recited in claim 3, wherein:

the selective video feed comprises a feed item from one or both of the first service feed and second service feed.

5. The video processing system for providing personalized video content feeds to users from the Internet as recited in claim 4, wherein the selective video feed is played serially to the user.

6. The video processing system for providing personalized video content feeds to users from the Internet as recited in claim 1, wherein the first Internet service requires credentials before allowing access to the first service feed.

7. The video processing system for providing personalized video content feeds to users from the Internet as recited in claim 1, wherein:

the selective video feed is filtered by the aggregation system as a function of the capability of a rendering agent, which is used to render the video content, the selective video feed is filtered by the aggregation system as a function of input associated with the first Internet service, and the input specifies a rendering agent that is precluded from playing some of the plurality of first feed items.

8. The video processing system for providing personalized video content feeds to users from the Internet as recited in claim 7, wherein the selective video feed is played serially to the user.

9. The video processing system for providing personalized video content feeds to users from the Internet as recited in claim 1, wherein the selective video feed is filtered by the aggregation system include one or more possible rendering agents.

10. The video processing system for providing personalized video content feeds to users from the Internet as recited in claim 1, wherein the selective video feed is filtered by the aggregation system to exclude one or more possible rendering agents.

11. The video processing system for providing personalized video content feeds to users from the Internet as recited in claim 1, wherein:
the first service feed further includes a plurality of third feed times that are text without any link to content, and
the aggregation system prevents the third feed items from being included in the first subset of the plurality of first feed items.

12. A method for providing personalized video content feeds to users from the Internet, the method comprising:
acquiring a first service feed, including a plurality of first feed items arranged serially that link to content objects, which are available from the Internet, from a first Internet service;
acquiring a second service feed, including a plurality of second feed items arranged serially that link to content objects, which are available from the Internet, from a second Internet service;
filtering the first service feed to a first subset of the plurality of first feed items such that the first subset is limited to those of the first service feed that link to video objects available over the Internet;
filtering the second service feed to a second subset of the plurality of second feed items such that the second subset is limited to those of the second service feed that link to video objects available over the Internet;
combining the first subset and the second subset into a video selective feed comprising a plurality of feed items that each include a link to a video object available using the Internet; and
delivering the video selective feed to a user.

13. The method for providing personalized video content feeds to users from the Internet as recited in claim 12, the method further comprising processing feed items in the video selective feed into a consistent user interface that serially plays the feed items.

14. The method for providing personalized video content feeds to users from the Internet as recited in claim 12, wherein the video selective feed is filtered as a function of the capability of a rendering agent associated with the user.

15. The method for providing personalized video content feeds to users from the Internet as recited in claim 12, wherein the video selective feed is played serially to the user.

16. The method for providing personalized video content feeds to users from the Internet as recited in claim 12, the method further comprising filtering the plurality of first feed items as a function of criteria specified by the user.

17. The method for providing personalized video content feeds to users from the Internet as recited in claim 12, wherein the acquiring of the first feed service includes presenting credentials of the user to the first Internet service that allows access to the plurality of first feed items.

18. A video processing system for providing personalized content feeds to users from the Internet, the video processing system comprising one or more hardware servers configured to:
acquire a first service feed, including a plurality of first feed items arranged serially that link to content objects, which are available from the Internet, from a first Internet service,
acquire a second service feed, including a plurality of second feed items arranged serially that link to content objects, which are available from the Internet, from a second Internet service,
filter the first service feed to a first subset of the plurality of first feed items such that the first subset is limited to those of the first service feed that link to video objects available over the Internet,
filter the second service feed to a second subset of the plurality of second feed items such that the second subset is limited to those of the second service feed that link to video objects available over the Internet,
combine the first subset and the second subset into a selective feed comprising a plurality of feed items that each include a link to a video object available using the Internet, and
deliver the selective feed to a user.

19. The video processing system for providing personalized content feeds to users from the Internet as recited in claim 18, wherein the selective video feed is played serially to the user.

20. The video processing system for providing personalized content feeds to users from the Internet as recited in claim 18, wherein:
the selective video feed comprises a feed item from one or both of the first service feed and/or second service feed, and
the feed item does not link to video content.

* * * * *